US012647980B2

(12) United States Patent
Shahmohammadian et al.

(10) Patent No.: US 12,647,980 B2
(45) Date of Patent: Jun. 2, 2026

(54) SCHEDULING RESTRICTIONS FOR A PHYSICAL DOWNLINK SHARED CHANNEL (PDSCH) DEMODULATION REFERENCE SIGNAL (DMRS)

(71) Applicant: Samsung Electronics Co., Ltd., Suwon-si (KR)

(72) Inventors: Hoda Shahmohammadian, San Diego, CA (US); Jung Hyun Bae, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 18/524,298

(22) Filed: Nov. 30, 2023

(65) Prior Publication Data

US 2024/0215026 A1 Jun. 27, 2024

Related U.S. Application Data

(60) Provisional application No. 63/533,813, filed on Aug. 21, 2023, provisional application No. 63/434,687, filed on Dec. 22, 2022.

(51) Int. Cl.
| | |
|---|---|
| *H04W 72/1273* | (2023.01) |
| *H04B 7/0452* | (2017.01) |
| *H04L 5/00* | (2006.01) |
| *H04W 72/04* | (2023.01) |

(52) U.S. Cl.
CPC ...... *H04W 72/1273* (2013.01); *H04B 7/0452* (2013.01); *H04L 5/0051* (2013.01); *H04W 72/04* (2013.01)

(58) Field of Classification Search
CPC ............. H04W 72/1273; H04W 72/04; H04W 72/0453; H04W 72/53; H04B 7/0452; H04L 5/0051; H04L 5/0044; H04L 5/0094; H04L 5/0016
See application file for complete search history.

(56) References Cited

U.S. PATENT DOCUMENTS

| | | | | |
|---|---|---|---|---|
| 9,167,571 | B2 * | 10/2015 | Ho | ......................... H04W 72/51 |
| 9,853,786 | B2 | 12/2017 | Seo et al. | |
| 10,756,866 | B2 | 8/2020 | Kwak et al. | |
| 11,902,205 | B2 * | 2/2024 | Molés | ............... H04W 72/0453 |
| 12,317,300 | B2 * | 5/2025 | Matsumura | ........... H04W 72/23 |

(Continued)

FOREIGN PATENT DOCUMENTS

| | | | | | |
|---|---|---|---|---|---|
| CA | 3035797 | C | * | 3/2022 | ............ H04W 72/23 |
| CN | 114337949 | A | * | 4/2022 | ........... H04L 5/0051 |

(Continued)

*Primary Examiner* — Julio R Perez
(74) *Attorney, Agent, or Firm* — Womble Bond Dickinson (US) LLP

(57) ABSTRACT

A system and a method are disclosed for processing a first PDSCH, the method includes processing the first PDSCH based on determining that one or more first restrictions apply to the first PDSCH, the one or more first restrictions including restricting a first allocation of resource blocks, such that a number of consecutively scheduled physical resource blocks (PRBs) in a bundle for the first PDSCH is even, or a number of common resource blocks (CRBs) offset from an initial CRB of a CRB grid for a set of consecutively scheduled PRBs for the first PDSCH is even.

11 Claims, 15 Drawing Sheets

1000

1001

Restrict an allocation of RBs, such that:

a minimum number of RBs allocated within an allocated PRG is at least equal to M1, wherein M1 is a minimum number of allocated RBs within each allocated PRG, M1 being greater than one; OR based on determining that a PRG size is configured for wideband, a minimum total number of RBs in a CDM group is at least equal to M2, wherein M2 is a minimum number of total allocated DL DMRS RBs, M2 being greater than one; OR based on determining that the PRG size is configured as two PRBs, a number of consecutively scheduled VRBs or PRBs for the PDSCH is even; OR based on determining that the PRG size is configured as two PRBs, a number of VRBs or PRBs offset from an initial CRB of a CRB grid for the PDSCH is even; OR a number of consecutively scheduled VRBs for the PDSCH is even; OR a number of CRBs or PRBs offset from the initial CRB of the CRB grid to a starting VRB for the PDSCH is even; OR a number of consecutively scheduled PRBs per bundle for the PDSCH is even, and a number of CRBs or PRBs offset to a starting PRB of a bundle of consecutively scheduled PRBs for the PDSCH from the initial CRB of the CRB grid is even; OR a number of consecutively scheduled VRBs per bundle for the PDSCH is even, and a number of CRBs or VRBs offset to the starting VRB of a bundle of consecutively scheduled VRBs for the PDSCH from the initial CRB of the CRB grid is even

(56)     References Cited

U.S. PATENT DOCUMENTS

| | | | |
|---|---|---|---|
| 2017/0294999 A1* | 10/2017 | Patel ..................... | H04W 72/12 |
| 2021/0195620 A1* | 6/2021 | Yoshimura ........ | H04W 72/1273 |
| 2021/0203463 A1* | 7/2021 | Li ......................... | H04L 5/0007 |
| 2022/0141857 A1* | 5/2022 | Lee ....................... | H04W 72/23 |
| | | | 370/329 |
| 2022/0416961 A1 | 12/2022 | Frenne et al. | |
| 2023/0216719 A1 | 7/2023 | Yoon | |

FOREIGN PATENT DOCUMENTS

| | | | | |
|---|---|---|---|---|
| CN | 118249857 A * | 6/2024 | ........... | H04L 5/0048 |
| KR | 10-2310506 B1 | 10/2021 | | |
| WO | 2013/020268 A1 | 2/2013 | | |
| WO | 2019/019173 A1 | 1/2019 | | |
| WO | 2023/050911 A1 | 4/2023 | | |

* cited by examiner

FIG. 1A
1
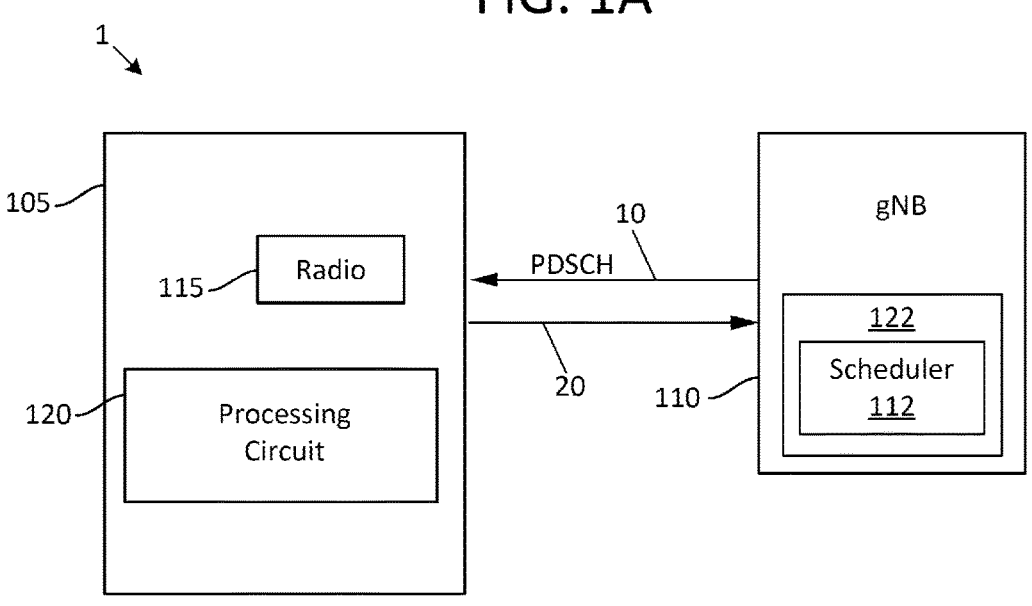
FIG. 1B
Type 1
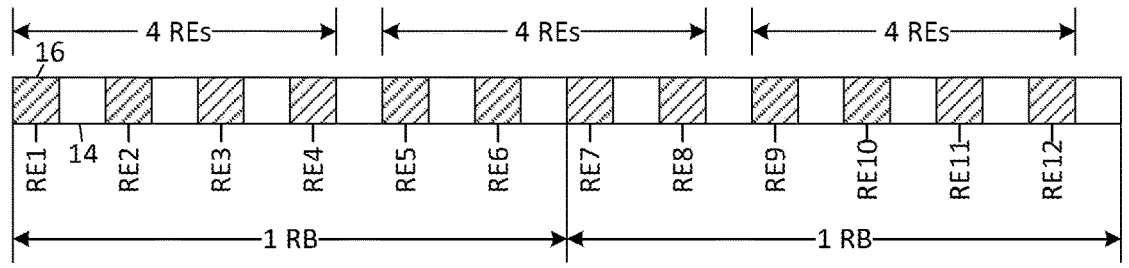
FIG. 1C
| CRB | CRB |
|-----|-----|
| VRB | VRB |
| PRB | PRB |
FIG. 1D
Type 2
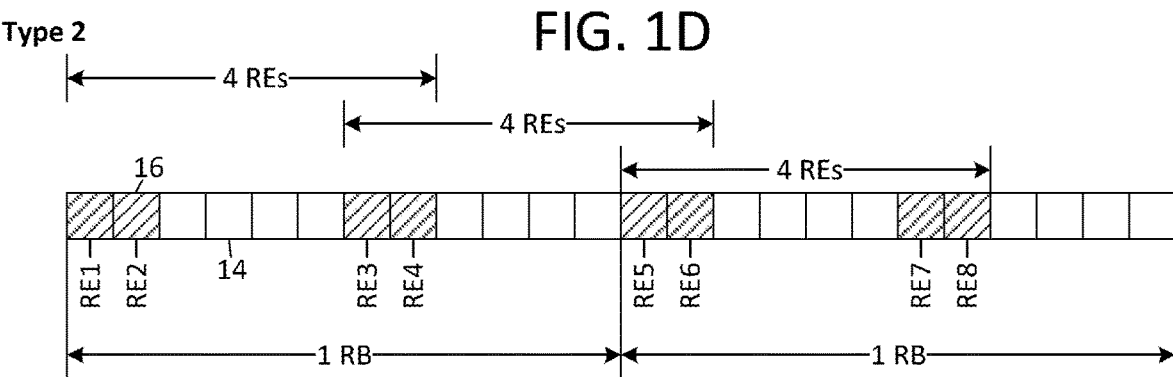

Non-interleaved mapping (e.g., one-to-one mapping) of VRBs to PRBs

FIG. 3

Interleaved mapping of VRBs to PRBs

Figure 6:
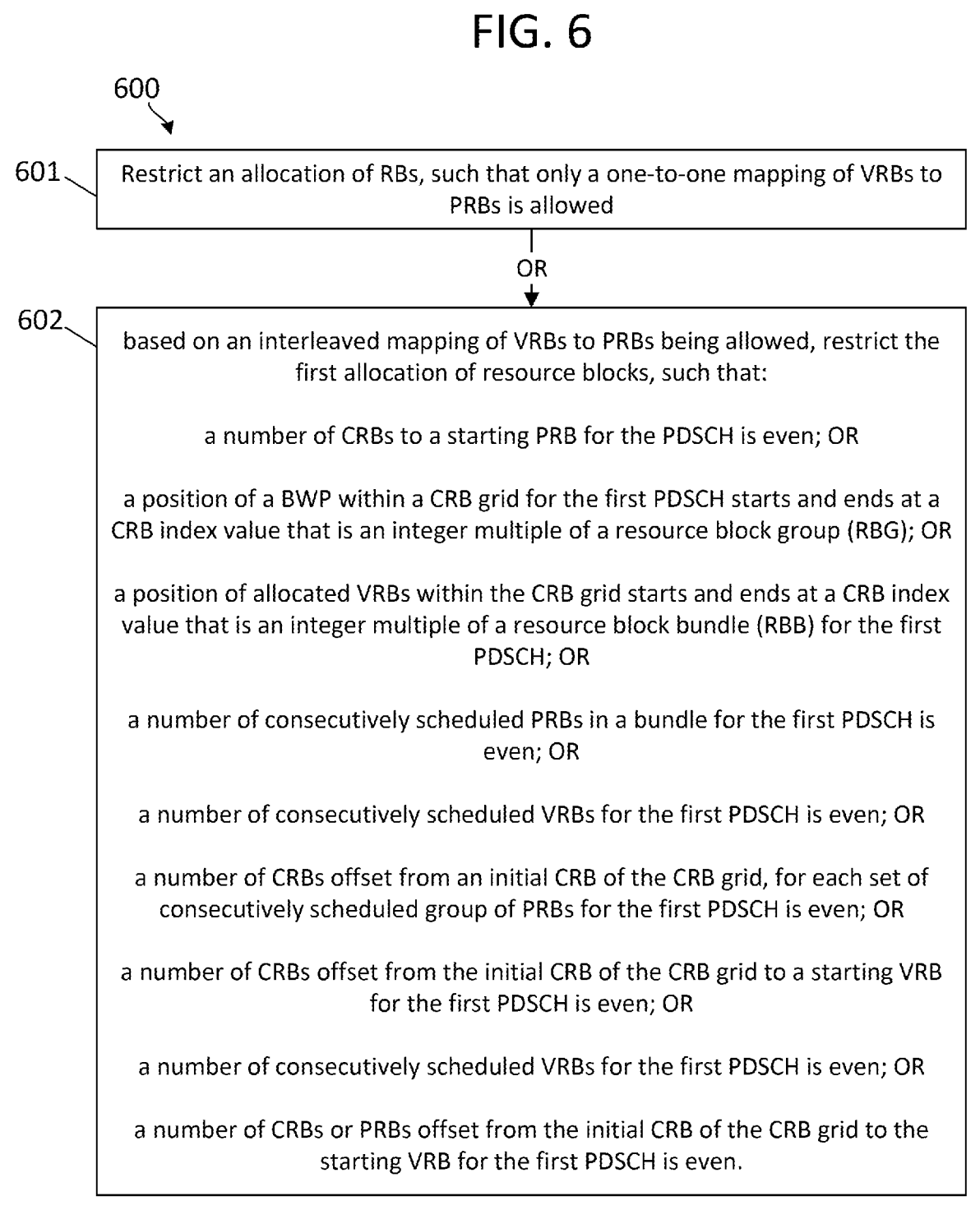

601 Restrict an allocation of RBs, such that only a one-to-one mapping of VRBs to PRBs is allowed

OR 602 based on an interleaved mapping of VRBs to PRBs being allowed, restrict the first allocation of resource blocks, such that:

a number of CRBs to a starting PRB for the PDSCH is even; OR a position of a BWP within a CRB grid for the first PDSCH starts and ends at a CRB index value that is an integer multiple of a resource block group (RBG); OR a position of allocated VRBs within the CRB grid starts and ends at a CRB index value that is an integer multiple of a resource block bundle (RBB) for the first PDSCH; OR a number of consecutively scheduled PRBs in a bundle for the first PDSCH is even; OR a number of consecutively scheduled VRBs for the first PDSCH is even; OR a number of CRBs offset from an initial CRB of the CRB grid, for each set of consecutively scheduled group of PRBs for the first PDSCH is even; OR a number of CRBs offset from the initial CRB of the CRB grid to a starting VRB for the first PDSCH is even; OR a number of consecutively scheduled VRBs for the first PDSCH is even; OR a number of CRBs or PRBs offset from the initial CRB of the CRB grid to the starting VRB for the first PDSCH is even.

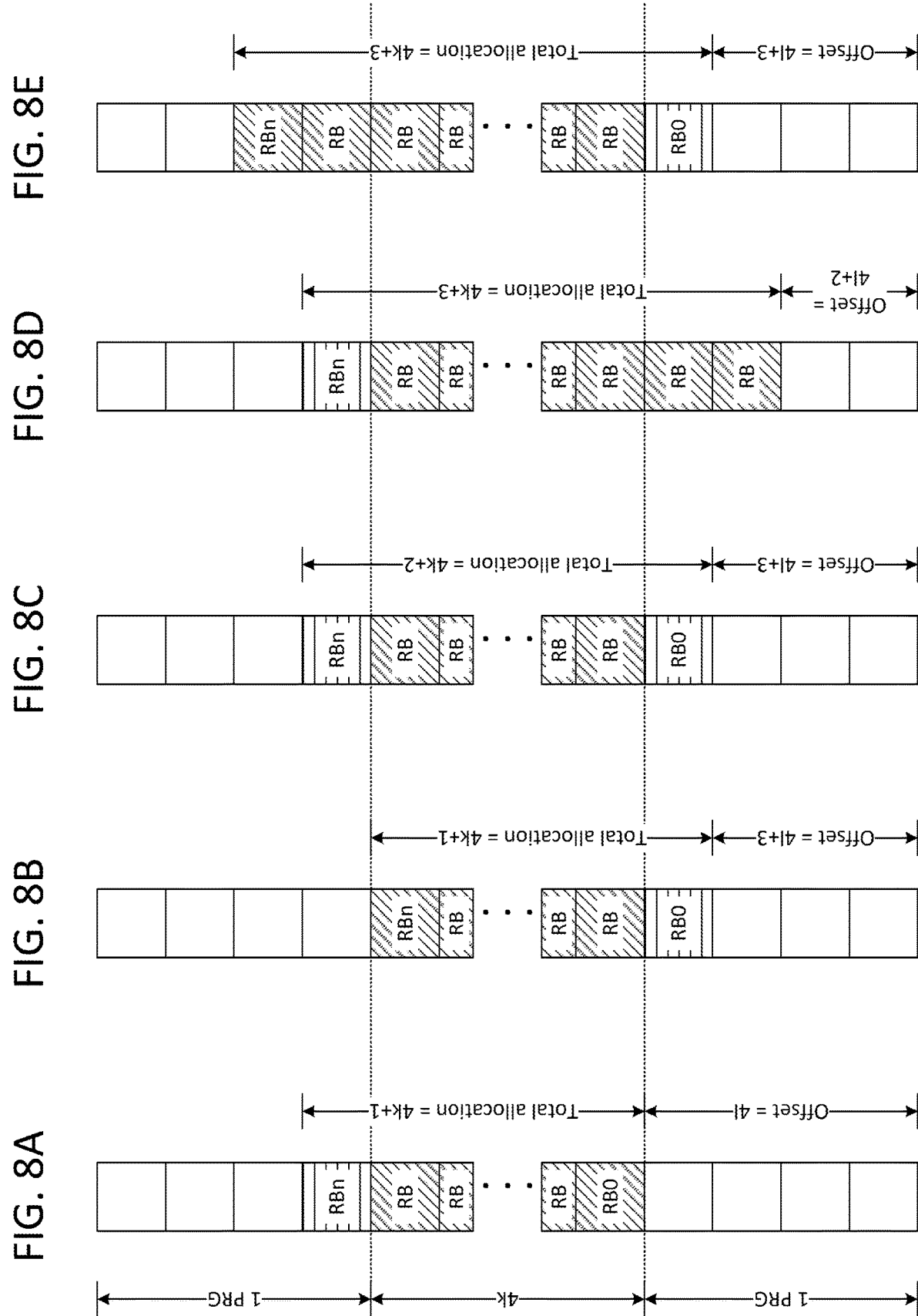

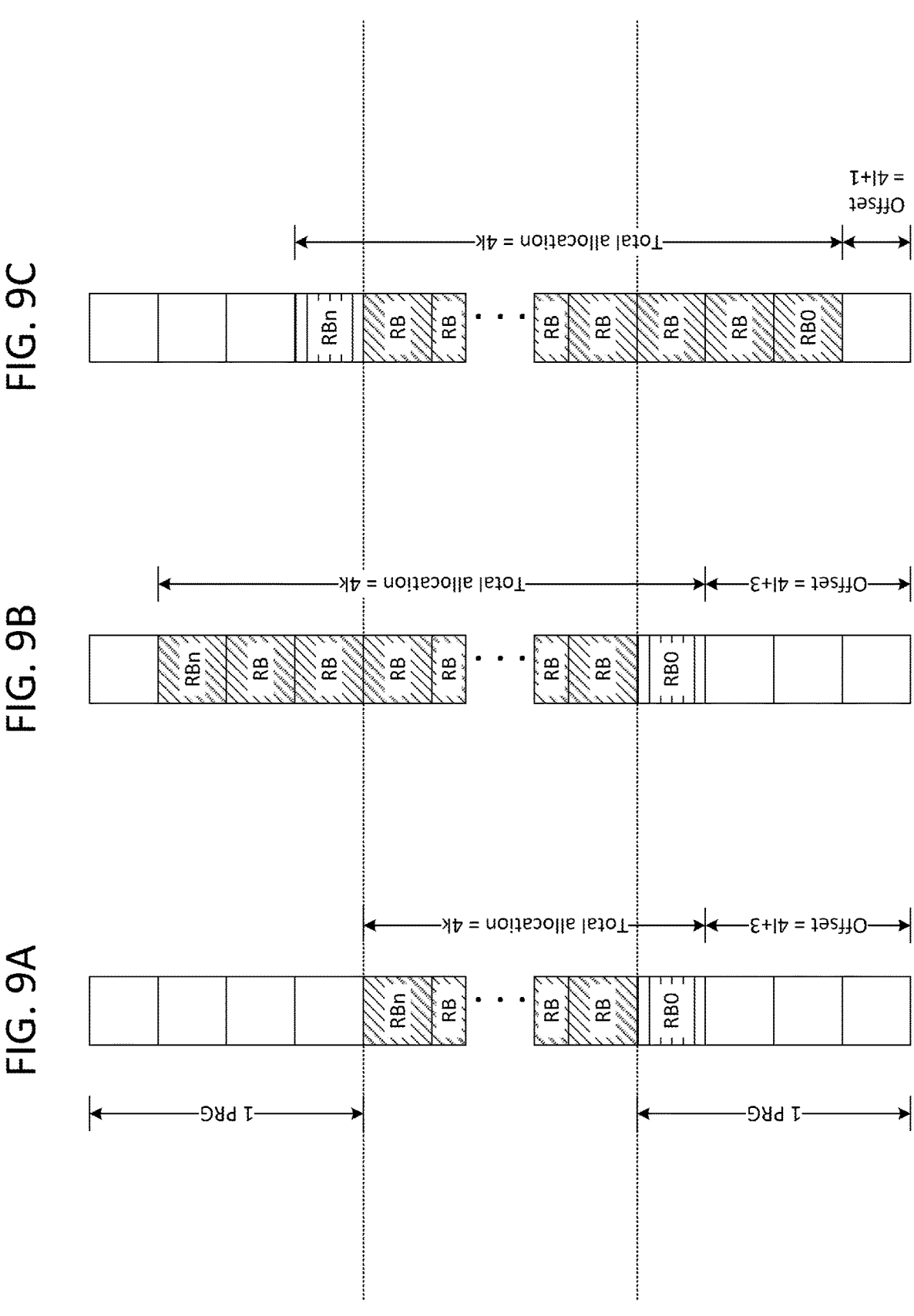

Figure 10:
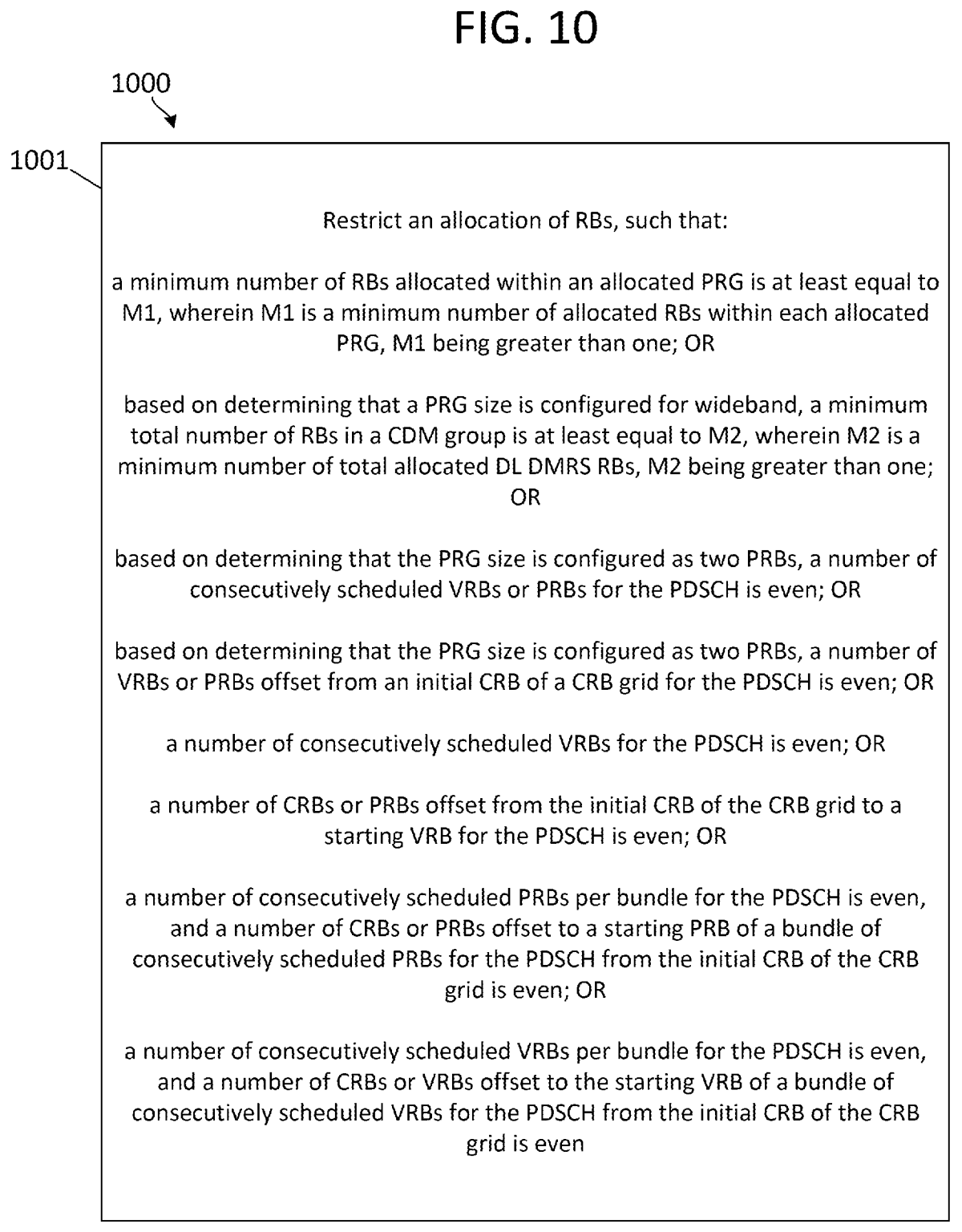

Restrict an allocation of RBs, such that:

a minimum number of RBs allocated within an allocated PRG is at least equal to M1, wherein M1 is a minimum number of allocated RBs within each allocated PRG, M1 being greater than one; OR based on determining that a PRG size is configured for wideband, a minimum total number of RBs in a CDM group is at least equal to M2, wherein M2 is a minimum number of total allocated DL DMRS RBs, M2 being greater than one; OR based on determining that the PRG size is configured as two PRBs, a number of consecutively scheduled VRBs or PRBs for the PDSCH is even; OR based on determining that the PRG size is configured as two PRBs, a number of VRBs or PRBs offset from an initial CRB of a CRB grid for the PDSCH is even; OR a number of consecutively scheduled VRBs for the PDSCH is even; OR a number of CRBs or PRBs offset from the initial CRB of the CRB grid to a starting VRB for the PDSCH is even; OR a number of consecutively scheduled PRBs per bundle for the PDSCH is even, and a number of CRBs or PRBs offset to a starting PRB of a bundle of consecutively scheduled PRBs for the PDSCH from the initial CRB of the CRB grid is even; OR a number of consecutively scheduled VRBs per bundle for the PDSCH is even, and a number of CRBs or VRBs offset to the starting VRB of a bundle of consecutively scheduled VRBs for the PDSCH from the initial CRB of the CRB grid is even

FIG. 11

SCHEDULING RESTRICTIONS FOR A PHYSICAL DOWNLINK SHARED CHANNEL (PDSCH) DEMODULATION REFERENCE SIGNAL (DMRS)

This application claims priority to and the benefit under 35 U.S.C. § 119(c) of U.S. Provisional Application No. 63/533,813, filed on Aug. 21, 2023, entitled "SCHEDULING RESTRICTION FOR PDSCH WITH FD-OCC LENGTH 4 ETYPE 1 DMRS," and of U.S. Provisional Application No. 63/434,687, filed on Dec. 22, 2022, entitled "SCHEDULING RESTRICTION FOR PDSCH WITH FD-OCC LENGTH 4 ETYPE 1 DMRS," the entire disclosures of both of which are incorporated by reference herein.

BACKGROUND

1. Field

Aspects of embodiments of the present disclosure relate to wireless communications. For example, aspects of embodiments of the present disclosure relate to improved systems and methods for scheduling a physical downlink shared channel (PDSCH) demodulation reference signal (DMRS).

2. Description of the Related Art

Modern communications equipment (e.g., mobile phones, vehicles, laptops, satellites, and the like), also known as user equipment (UE), may communicate with a network node (e.g., a base station) to receive data from a network associated with the network node. The data may be received by the UE via a PDSCH.

The above information disclosed in this Background section is for enhancement of understanding of the background of the present disclosure, and, therefore, it may contain information that does not constitute prior art.

SUMMARY

Restrictions to PDSCH scheduling may be introduced from a network side of a communications system to improve the transfer of data from a base station to a UE via a PDSCH. For example, restrictions may be provided to reduce the occurrence of PDSCH issues, including "orphan" resource elements (REs) and/or insufficient sampling, which may result in degraded communications.

Although some standardized restrictions may be followed to reduce the occurrence of some PDSCH issues, there may be some circumstances that cause the PDSCH issues even if the standardized restrictions are followed.

To overcome these issues, systems and methods are described herein for restricting PDSCH scheduling to reduce (e.g., to prevent) the occurrence of PDSCH issues.

Some embodiments of the present disclosure are directed to preventing an occurrence of orphan REs for a PDSCH with frequency-domain orthogonal-cover code (FD-OCC) length 4 eType 1 demodulation reference signal (DMRS) by applying one or more restrictions to the PDSCH.

Some embodiments of the present disclosure are directed to reducing (e.g., preventing) an occurrence of insufficient sampling for a PDSCH with FD-OCC length 4 eType 2 DMRS by applying one or more restrictions to the PDSCH.

The above approaches improve on previous methods because the restrictions may reduce (e.g., prevent) the occurrence of PDSCH issues, which would otherwise reduce a UEs ability to perform channel estimation, frequency domain interpolation, and denoising in some scenarios.

According to some embodiments of the present disclosure, a method for processing a first PDSCH includes processing the first PDSCH based on determining that one or more first restrictions apply to the first PDSCH, the one or more first restrictions including restricting a first allocation of resource blocks, such that a number of consecutively scheduled physical resource blocks (PRBs) in a bundle for the first PDSCH is even, or a number of common resource blocks (CRBs) offset from an initial CRB of a CRB grid for a set of consecutively scheduled PRBs for the first PDSCH is even.

The method may further include processing a second PDSCH based on determining that one or more second restrictions apply to the second PDSCH, the one or more second restrictions including restricting a second allocation of resource blocks, such that only a one-to-one mapping of virtual resource blocks (VRBs) to PRBs is allowed, or based on an interleaved mapping of VRBs to PRBs being allowed, restricting the second allocation of resource blocks, such that a number of CRBs to a starting PRB for the second PDSCH is even, or a position of a BWP within a CRB grid for the second PDSCH starts and ends at a CRB index value that is an integer multiple of a resource block group (RBG), or a position of allocated VRBs within the CRB grid starts and ends at a CRB index value that is an integer multiple of a resource block bundle (RBB) for the second PDSCH, or a number of consecutively scheduled VRBs for the second PDSCH is even, or a number of CRBs offset from the initial CRB of the CRB grid to a starting VRB for the second PDSCH is even, or a number of consecutively scheduled VRBs for the second PDSCH is even, or a number of CRBs or PRBs offset from the initial CRB of the CRB grid to the starting VRB for the second PDSCH is even.

The method may further include based on restricting the second allocation of resource blocks, such that only the one-to-one mapping of VRBs to PRBs is allowed, supporting FD-OCC length 4 eType 2 DMRS.

The one or more first restrictions may be applied based on determining that a UE associated with processing the first PDSCH is configured to process the first PDSCH only with restrictions.

The method may further include, based on determining that a second PDSCH corresponds to a frequency-division multiplexing Scheme A (fdmSchemeA) transmission or a frequency-division multiplexing Scheme B (fdmSchemeB) transmission, processing the second PDSCH based on determining that one or more second restrictions apply to the second PDSCH, the one or more second restrictions including restricting a second allocation of resource blocks, such that a number of consecutively scheduled PRBs for the second PDSCH for a transmission-and-reception point/ transmission configuration indicator (TRP/TCI) state is even, or a number of PRBs offset from the initial CRB of the CRB grid for the second PDSCH to a TRP/TCI state is even, or a multi-user, multiple input, multiple output (MU-MIMO) frequency division multiplexing (FDM)-based multi-TRP (MTRP) PDSCH is prevented for the second PDSCH, or a number of consecutively scheduled PRBs for the second PDSCH for a TRP frequency-domain resource allocation is even, or a number of PRBs offset from an initial CRB of the CRB grid for the second PDSCH to the TRP frequency-domain resource allocation is even.

According to other embodiments of the present disclosure, a method for processing a first PDSCH includes processing the first PDSCH based on determining that one or more first restrictions apply to the first PDSCH, the one or more first restrictions including restricting an allocation of resource blocks (RBs), such that a minimum number of RBs allocated within an allocated PRG is at least equal to M1, wherein M1 is a minimum number of allocated RBs within each allocated PRG, M1 being greater than one, or based on determining that a PRG size is configured for wideband, a minimum total number of RBs in a code division multiplexing (CDM) group is at least equal to M2, wherein M2 is a minimum number of total allocated DL DMRS RBs, M2 being greater than one, or based on determining that the PRG size is configured as two PRBs, a number of consecutively scheduled VRBs or PRBs for the first PDSCH is even, or based on determining that the PRG size is configured as two PRBs, a number of VRBs or PRBs offset from an initial CRB of a CRB grid for the first PDSCH is even, or a number of consecutively scheduled VRBs for the first PDSCH is even, or a number of CRBs or PRBs offset from the initial CRB of the CRB grid to a starting VRB for the first PDSCH is even, or a number of consecutively scheduled PRBs per bundle for the first PDSCH is even, and a number of CRBs or PRBs offset to a starting PRB of a bundle of consecutively scheduled PRBs for the first PDSCH from the initial CRB of the CRB grid is even, or a number of consecutively scheduled VRBs per bundle for the first PDSCH is even, and a number of CRBs or VRBs offset to the starting VRB of a bundle of consecutively scheduled VRBs for the first PDSCH from the initial CRB of the CRB grid is even.

The method may further include, based on determining that a second PDSCH is configured for a PRG size of four and M1 or M2 is equal to two, processing the second PDSCH based on determining that one or more second restrictions apply to the second PDSCH, the one or more second restrictions including restricting a second allocation of resource blocks, such that a total number of RBs in a CDM group for the second PDSCH is greater than M1 or M2, or a total number of consecutively scheduled VRBs or PRBs for the second PDSCH in the CDM group is 4k+1, and a number of VRBs or PRBs offset from an initial CRB of the CRB grid for the second PDSCH being 4l or 4l+3 is prevented, wherein k and l are integers, or a total number of consecutively scheduled VRBs or PRBs for the second PDSCH in a CDM group is 4k+2, and a number of VRBs or PRBs offset from the initial CRB of the CRB grid for the second PDSCH being 4l+3 is prevented, wherein k and l are integers, or a total number of consecutively scheduled VRBs or PRBs for a PDSCH in a CDM group is 4k+3, and a number of VRBs or PRBs offset from the initial CRB of the CRB grid for the second PDSCH being 4l+2 or 4l+3 is prevented, wherein k and l are integers, or a total number of consecutively scheduled VRBs or PRBs for a PDSCH in a CDM group is 4k, and a number of VRBs or PRBs offset from the initial CRB of the CRB grid for the second PDSCH being 4l+1 or 4l+3 is prevented, wherein k and l are integers.

The method may further include, based on determining that a second PDSCH is configured for a PRG size of four and M1 or M2 is equal to three, processing the second PDSCH based on determining that one or more second restrictions apply to the second PDSCH, the one or more second restrictions including restricting a second allocation of resource blocks, such that a total number of RBs in a CDM group is greater than M1 or M2, wherein M1 is a minimum number of allocated RBs within each allocated PRG, and wherein M2 is a minimum number of total allocated RBs, or a total number of consecutively scheduled VRBs or PRBs for the second PDSCH in a CDM group is 4k+2, and a number of VRBs or PRBs offset from an initial CRB of the CRB grid for the second PDSCH being 4l+2 or 4l+3 is prevented, wherein k and l are integers, or a total number of consecutively scheduled VRBs or PRBs for the second PDSCH in a CDM group is 4k, and a number of VRBs or PRBs offset from the initial CRB of the CRB grid for the second PDSCH is 4l, wherein k and l are integers.

The one or more first restrictions may further include restricting a first allocation of resource blocks (RBs), such that a number of consecutively scheduled PRBs for the first PDSCH is even, and a number of PRBs offset from the initial CRB of the CRB grid to the first PDSCH is even.

According to other embodiments of the present disclosure, a system for scheduling a first PDSCH includes a UE including a processing circuit and memory including instructions that, when executed by the processing circuit, cause the UE to process the first PDSCH based on determining that one or more first restrictions apply to the first PDSCH, the one or more first restrictions including restricting a first allocation of resource blocks for the first PDSCH, such that a number of consecutively scheduled physical resource blocks (PRBs) in a bundle for the first PDSCH is even, or a number of common resource blocks (CRBs) offset from an initial CRB of a CRB grid for a set of consecutively scheduled PRBs for the first PDSCH is even.

The instructions, when executed by the processing circuit, may further cause the UE to process a second PDSCH based on determining that one or more second restrictions apply to the second PDSCH, the one or more second restrictions including restricting a second allocation of resource blocks for the second PDSCH, such that only a one-to-one mapping of virtual resource blocks (VRBs) to PRBs is allowed, or a number of consecutively scheduled VRBs for the second PDSCH is even, and a number of CRBs or PRBs offset from an initial CRB of a CRB grid to a starting VRB for the second PDSCH is even.

The instructions, when executed by the processing circuit, may further cause the UE to process a second PDSCH based on determining that one or more second restrictions apply to the second PDSCH, the one or more second restrictions including restricting a second allocation of resource blocks for the second PDSCH, such that a minimum number of RBs allocated within an allocated PRG is at least equal to M1, wherein M1 is a minimum number of allocated RBs within an allocated PRG.

The instructions, when executed by the processing circuit, may further cause the UE to process a second PDSCH based on determining that one or more second restrictions apply to the second PDSCH, the one or more second restrictions including based on the second PDSCH having a PRG size of wideband, a minimum total number of RBs in a code division multiplexing (CDM) group is at least equal to M2, wherein M2 is a minimum number of total allocated RBs.

The instructions, when executed by the processing circuit, may further cause the UE to process a second PDSCH based on determining that one or more second restrictions apply to the second PDSCH, the one or more second restrictions including based on the second PDSCH having a PRG size of 2, restricting a second allocation of resource blocks for the second PDSCH, such that a number of consecutively scheduled VRBs or PRBs for the first PDSCH is even.

The instructions, when executed by the processing circuit, may further cause the UE to process a second PDSCH based on determining that one or more second restrictions apply to the second PDSCH, the one or more second restrictions including based on the second PDSCH having a PRG size of 4 and M1 or M2 being equal to two, restricting a second allocation of resource blocks for the second PDSCH, such that a total number of RBs in a CDM group is greater than M1 or M2, wherein M1 is a minimum number of allocated RBs within each allocated PRG, and wherein M2 is a minimum number of total allocated RBs.

The instructions, when executed by the processing circuit, may further cause the UE to process a second PDSCH based on determining that one or more second restrictions apply to the second PDSCH, the one or more second restrictions including based on the second PDSCH having a PRG size of 4 and M1 or M2 being equal to three, restricting a second allocation of resource blocks for the second PDSCH, such that a total number of consecutively scheduled VRBs or PRBs for a PDSCH in a CDM group is 4k+2, and a number of VRBs or PRBs offset from an initial CRB of a CRB grid for the second PDSCH being 4l+2 or 4l+3 is prevented, wherein M1 is a minimum number of allocated RBs within each allocated PRG, wherein M2 is a minimum number of total allocated RBs, and wherein k and l are integers.

The instructions, when executed by the processing circuit, may further cause the UE to process a second PDSCH based on determining that one or more second restrictions apply to the second PDSCH, the one or more second restrictions including based on the second PDSCH having a PRG size of 4 and M1 or M2 being equal to three, restricting a second allocation of resource blocks for the second PDSCH, such that a total number of consecutively scheduled VRBs or PRBs for a PDSCH in a CDM group is 4k, and a number of VRBs or PRBs offset from an initial CRB of a CRB grid for the second PDSCH is 4l, wherein M1 is a minimum number of allocated RBs within each allocated PRG, wherein M2 is a minimum number of total allocated RBs, and wherein k and l are integers.

The instructions, when executed by the processing circuit, may further cause the UE to process a second PDSCH based on determining that one or more second restrictions apply to the second PDSCH, the one or more second restrictions including restricting a second allocation of resource blocks for the second PDSCH, such that a number of common resource blocks (CRBs) to a starting PRB for the second PDSCH is even.

The instructions, when executed by the processing circuit, may further cause the UE to process a second PDSCH based on determining that one or more second restrictions apply to the second PDSCH, the one or more second restrictions including restricting a second allocation of resource blocks for the second PDSCH, such that a position of a bandwidth part (BWP) within a CRB grid for the second PDSCH starts and ends at a CRB index value that is an integer multiple of a resource block group (RBG).

The instructions, when executed by the processing circuit, may further cause the UE to process a second PDSCH based on determining that one or more second restrictions apply to the second PDSCH, the one or more second restrictions including restricting a second allocation of resource blocks for the second PDSCH, such that a position of allocated VRBs within a CRB grid for the second PDSCH starts and ends at a CRB index value that is an integer multiple of a resource block bundle (RBB).

BRIEF DESCRIPTION OF THE DRAWINGS

The above and other aspects of the present disclosure will be more clearly understood from the following detailed description of the illustrative, non-limiting embodiments with reference to the accompanying drawings, in which:

FIG. 1A is a block diagram depicting a system for processing a PDSCH, according to some embodiments of the present disclosure;

FIG. 1B is a diagram depicting positions of REs within resource blocks (RBs) for a PDSCH with FD-OCC length 4 eType 1 DMRS ("Type 1"), according to some embodiments of the present disclosure;

FIG. 1C is a diagram depicting control resource blocks (CRBs), virtual resource blocks (VRBs), and physical resource blocks (PRBs) associated with PDSCHs, according to some embodiments of the present disclosure;

FIG. 1D is a diagram depicting positions of REs within resource blocks (RBs) for a PDSCH with FD-OCC length 4 eType 2 DMRS ("Type 2"), according to some embodiments of the present disclosure;

FIG. 3 is a diagram depicting an interleaved mapping of VRBs to PRBs, according to some embodiments of the present disclosure;

FIG. 6 is a flowchart depicting a method for a scheduling of PDSCH for Type 1, according to some embodiments of the present disclosure to reduce (e.g., to prevent) the occurrence of orphan REs;

FIG. 7A is a diagram depicting a scheduling of PDSCH for Type 2, using standardized restrictions and resulting in insufficient sampling, wherein the PRG size is 2 RBs, a number of consecutively scheduled VRBs (or PRBs) is odd, and a number of VRBs (or PRBs) offset from an initial CRB is even;

FIG. 7B is a diagram depicting a scheduling of PDSCH for Type 2, using standardized restrictions and resulting in insufficient sampling, wherein the PRG size is 2 RBs, the number of consecutively scheduled VRBs (or PRBs) is odd, and the number of VRBs (or PRBs) offset from an initial CRB is odd;

FIG. 7C is a diagram depicting a scheduling of PDSCH for Type 2, using standardized restrictions and resulting in insufficient sampling, wherein the PRG size is 2 RBs, the number of consecutively scheduled VRBs (or PRBs) is even, and the number of VRBs (or PRBs) offset from the initial CRB is odd;

FIG. 8A is a diagram depicting a scheduling of PDSCH for Type 2, resulting in insufficient sampling, wherein the PRG size is 4 RBs, the number of consecutively scheduled VRBs (or PRBs) is 4k+1, and the number of VRBs (or PRBs) offset from an initial CRB is 4l, wherein k and l are integers;

FIG. 8B is a diagram depicting a scheduling of PDSCH for Type 2, resulting in insufficient sampling, wherein the PRG size is 4 RBs, the number of consecutively scheduled VRBs (or PRBs) is 4k+1, and the number of VRBs (or PRBs) offset from an initial CRB is 4l+3, wherein k and l are integers;

FIG. 8C is diagram depicting a scheduling of PDSCH for Type 2, resulting in insufficient sampling, wherein the PRG size is 4 RBs, the number of consecutively scheduled VRBs (or PRBs) is 4k+2, and the number of VRBs (or PRBs) offset from an initial CRB is 4l+3, wherein k and l are integers;

FIG. 8D is a diagram depicting a scheduling of PDSCH for Type 2, resulting in insufficient sampling, wherein the PRG size is 4 RBs, the number of consecutively scheduled VRBs (or PRBs) is 4k+3, and the number of VRBs (or PRBs) offset from an initial CRB is 4l+2, wherein k and l are integers;

FIG. 8E is diagram depicting a scheduling of PDSCH for Type 2, resulting in insufficient sampling, wherein the PRG size is 4 RBs, the number of consecutively scheduled VRBs (or PRBs) is 4k+3, and the number of VRBs (or PRBs) offset from an initial CRB is 4l+3, wherein k and l are integers;

FIG. 9A is a diagram depicting a scheduling of PDSCH for Type 2, resulting in insufficient sampling, wherein the PRG size is 4 RBs, the number of consecutively scheduled VRBs (or PRBs) is 4k, and the number of VRBs (or PRBs) offset from an initial CRB is 4l+3, wherein k and l are integers;

FIG. 9B is diagram depicting a scheduling of PDSCH for Type 2, resulting in insufficient sampling, wherein the PRG size is 4 RBs, the number of consecutively scheduled VRBs (or PRBs) is 4k, and the number of VRBs (or PRBs) offset from an initial CRB is 4l+3, wherein k and l are integers;

FIG. 9C is diagram depicting a scheduling of PDSCH for Type 2, resulting in insufficient sampling, wherein the PRG size is 4 RBs, the number of consecutively scheduled VRBs (or PRBs) is 4k, and the number of VRBs (or PRBs) offset from an initial CRB is 4l+1, wherein k and l are integers;

FIG. 10 is a flowchart depicting a method for a scheduling of PDSCH for Type 2, according to some embodiments of the present disclosure to reduce (e.g., to prevent) the occurrence of insufficient sampling; and FIG. 11 is a block diagram of an electronic device in a network environment, according to some embodiments of the present disclosure.

DETAILED DESCRIPTION

Figure 2:
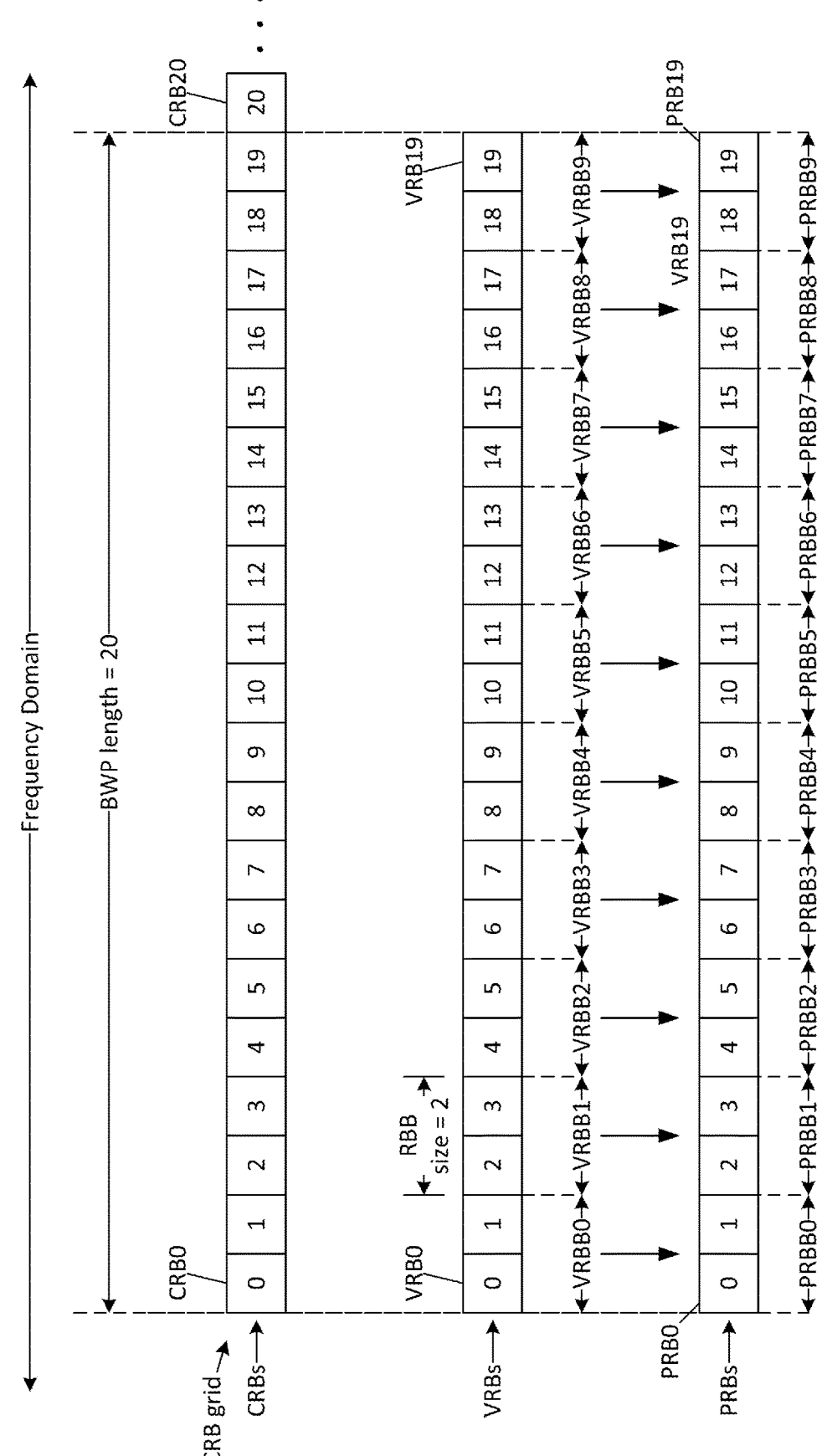
FIG. 2 is a diagram depicting a non-interleaved (e.g., a one-to-one mapping) of VRBs to PRBs, according to some embodiments of the present disclosure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the terms "or" and "and/or" include any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The electronic or electric devices and/or any other relevant devices or components according to embodiments of the present disclosure described herein may be implemented utilizing any suitable hardware, firmware (e.g., an application-specific integrated circuit (ASIC)), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

As discussed above, modern communications equipment (e.g., mobile phones, vehicles, laptops, satellites, and the like), also known as a UE, may communicate with a network node (e.g., a base station) to receive data from a network associated with the base station. The data may be received by the UE via a PDSCH.

Restrictions to PDSCH scheduling may be introduced from a network side of a communications system to improve the transfer of data from a base station to a UE via a PDSCH. For example, restrictions may be provided to reduce the occurrence of PDSCH issues, including orphan REs and/or insufficient sampling, which may result in degraded communications. As used herein, "orphan REs" refers to first REs (e.g., a set of neighboring REs) within a first resource block that are separated from second REs (e.g., adjacent REs from a neighboring resource block) after VRB-to-PRB mapping, such that the first REs cannot be used properly by a UE for channel estimation. For example, orphan REs may hinder the UE's ability to perform channel estimation. As used herein, "insufficient sampling" refers to having an insufficient number of RBs (e.g., only one RB) included in a PRG for Type 2. As used herein, "RB" may be used to refer to a resource block (for example, a CRB, a VRB, or a PRB). Insufficient sampling may hinder the UE's ability to perform frequency domain interpolation operations to fully recover the channel and may hinder the UE's ability to perform denoising operations.

There are two types of frequency domain resource allocation (FDRA) schemes that may be supported for downlink (DL) transmission: FDRA type 0 and FDRA type 1. An FDRA scheme may allow a scheduler to allocate RBs for transmissions from the network node to the UE. The FDRA scheme may be indicated to the UE implicitly by downlink control information (DCI) format or explicitly by a radio resource control (RRC) layer message.

In FDRA type 0, multiple numbers of consecutive virtual resource blocks (VRBs) are grouped into resource block groups (RBGs). The number of VRBs within an RBG may be an even number (e.g., 2, 4, 8, or 16) and may depend on BWP size and configuration. RBGs may be counted with reference to an initial CRB of a CRB grid for the DL transmission (also referred to as "point A" or CRB0).

A PDSCH may be allocated in units of RBG through a bitmap in DCI format 1_1/1_2. With the bitmap structure, the allocated RBGs may not be consecutive (e.g., may be discontinuous). However, in FDRA type 0, VRB-to-PRB mapping may be performed in a non-interleaved (also referred to as "one-to-one") manner, wherein an n-th VRB ($VRB_n$) is directly mapped to an n-th PRB ($PRB_n$).

Aspects of embodiments of the present disclosure provide improvements to PDSCH related to FDRA type 1. As will be discussed in further detail below, FDRA type 1, frequency resource allocations may be provided as a set of contiguously allocated VRBs that are indicated to the UE by two parameters: a parameter indicating an RB start (e.g., a VRB start) and a parameter indicating a number of consecutive RBs within a specific BWP.

FDRA type 0 and FDRA type 1 include two allocation types for scheduling a PDSCH with FD-OCC length 4: enhanced Type 1 (eType 1) DMRS (also referred to herein as "Type 1") or enhanced Type 2 (eType 2) DMRS (also referred to herein as "Type 2"). With the support of FD-OCC length 4 in the New Radio (NR) specification (e.g., 3GPP TS 38.211 V18.0.0, hereinafter the "NR Spec"), for DMRS, when a total number of DL eType 1 DMRS REs in a code-division-multiplexing (CDM) group (e.g., per port or per user) is not a multiple of four, some embodiments may address decoding and channel estimation concerns at the UE for orphan REs, as discussed in further detail below with respect to FIGS. 5C-5E. Although the present disclosure refers to some embodiments in relation to a specific types of FDRA and/or specific types of DMRS, the embodiments may be useful for other types of FDRA and/or other types of DMRS.

FIG. 1A is a block diagram depicting a system for processing a PDSCH, according to some embodiments of the present disclosure.

Referring to FIG. 1A, the system 1 may include a UE 105 and a network node 110 (e.g., a gNodeB, also referred to as a "base station"), in communication with each other. The UE 105 may include a radio 115 and a means for processing. The means for processing may include a processing circuit 120, which may perform various methods disclosed herein, e.g., the methods illustrated in FIGS. 6 and 10. The radio 115 may correspond to the communication module 1190 (see FIG. 11). The processing circuit 120 may correspond to the processor 1120 (see FIG. 11). The processing circuit 120 may receive, via the radio 115, transmissions from the network node 110, and the processing circuit 120 may transmit, via the radio 115, signals to the network node 110. A transmission from the network node 110 may be provided to the UE 105 via a PDSCH 10. A transmission from the UE 105 may be provided to the network node 110 via a physical uplink shared channel (PUSCH) 20. Aspects of some embodiments of the present disclosure are associated with scheduling one or more PDSCHs 10. In some embodiments, the network node 110 may include a processing circuit 122, which includes a scheduler 112 for applying restrictions to the PDSCH 10.

FIG. 1B is a diagram depicting positions of REs within resource blocks (RBs) for Type 1, according to some embodiments of the present disclosure.

Referring to FIG. 1B, each RB for a PDSCH (e.g., for a PDSCH in Type 1) may include two types of REs. A first type of RE may be PDSCH data REs 14 (depicted as blank or white boxes in FIG. 1B). A second type of RE may be PDSCH DMRS REs 16 (depicted as boxes with a diagonal hatch pattern in FIG. 1B). Because the present disclosure is primarily focused on the scheduling and processing of PDSCH DMRS, the present disclosure refers to PDSCH DMRS REs 16 as "REs." That is, unless otherwise indicated, "RE," as used herein, refers to a PDSCH DMRS RE. Additionally, unless otherwise indicated, "PDSCH," as used herein, refers to PDSCH DMRS. For example, each RB in Type 1 may include six REs (e.g., includes six PDSCH DMRS REs) per RB for allocating to the UE 105 for a PDSCH (e.g., for a PDSCH DMRS). The six REs may include RE1 through RE6 in a first RB. Another six REs (e.g., RE7 through RE12) may be included in a second RB. For proper despreading and channel estimation, the UE 105 may process four contiguously allocated REs (e.g., RE1 through RE4, RE5 through RE8, etc.). If the UE 105 receives fewer than four contiguously allocated REs in Type 1, channel estimation may be compromised.

FIG. 1C is a diagram depicting CRBs, VRBs, and PRBs associated with the PDSCH 10, according to some embodiments of the present disclosure.

Referring to FIG. 1C, and as discussed in further detail below, restrictions may be applied to resource allocation based on the relationships between CRBs, VRBs, and PRBs for a given PDSCH.

FIG. 1D is a diagram depicting positions of REs within resource blocks (RBs) for Type 2, according to some embodiments of the present disclosure.

Referring to FIG. 1D, each RB for a PDSCH in Type 2 may include four REs per RB for allocating to the UE 105 for a PDSCH. The four REs may include RE1 through RE4 in a first RB. Another four REs (e.g., RE5 through RE8) may be included in a second RB. For proper frequency domain interpolation and denoising, the UE 105 may process a minimum number of RBs as discussed below (e.g., see the disclosure related to FIGS. 7A-10 below).

FIG. 2 is a diagram depicting a non-interleaved mapping (e.g., a one-to-one mapping) of VRBs to PRBs, according to some embodiments of the present disclosure.

Referring to FIG. 2, CRBs, VRBs, and PRBs may be related to each other in a frequency domain having an initial CRB (e.g., CRB0) of a CRB grid associated with a given PDSCH. For example, the CRB grid may include CRB0 through a given CRB for a given bandwidth (e.g., CRB20). Each CRB may correspond to a VRB (e.g., VRB0 through VRB19). Each CRB and VRB may also correspond to a PRB (e.g., PRB0 through PRB19). The VRBs may be grouped into RBBs (also referred to herein as VRBBs) (e.g., VRBB0 through VRBB9, when an RBB size is configured for 2 RBs and a BW length is 20 RBs). The PRBs may be grouped into RBBs (also referred to herein as "PRBBs") (e.g., PRBB0 through PRBB9, when the RBB size is configured for 2 RBs and the BW length is 20 RBs). For non-interleaved (or one-to-one) mapping, each VRBB may be mapped to its corresponding PRBB (e.g., VRBB0 may be mapped to PRBB0; VRBB1 may be mapped to PRBB1, etc.).

Figure 3:
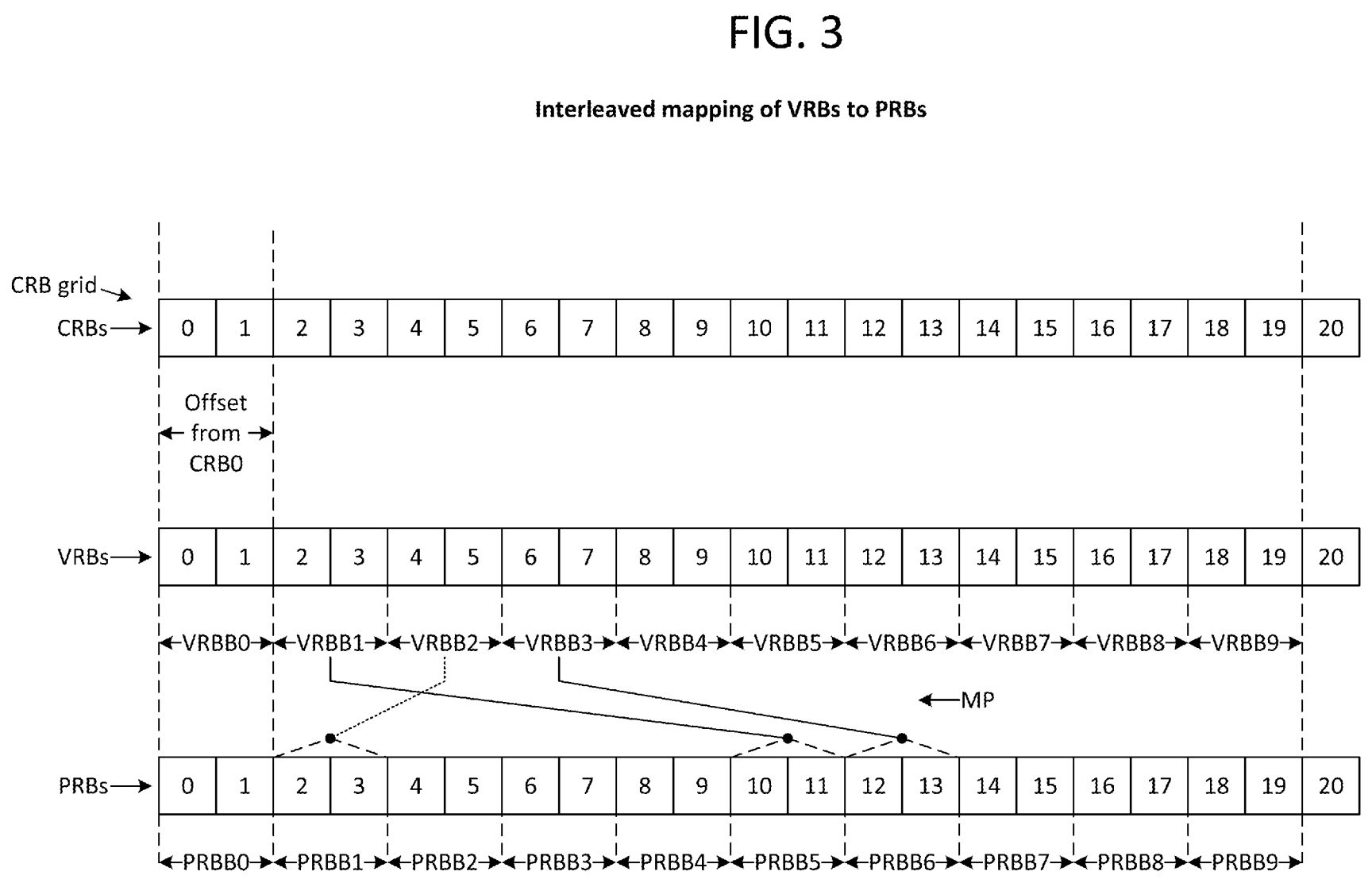

FIG. 3 is a diagram depicting an interleaved mapping of VRBs to PRBs, according to some embodiments of the present disclosure.

Referring to FIG. 3, an interleaved mapping MP may be performed to make decoding and channel estimation easier for a UE by, for example, having every portion of data experience a different sample of error and noise. Interleaving may be determined based on an equation, such as Equation 1 above. Based on the equation, two VRBBs that neighbor each other may be separated after mapping to their respective PRBBs. For example, VRBB1 may be mapped to PRBB5 and VRBB2 may be mapped to PRBB1.

Figure 4A:
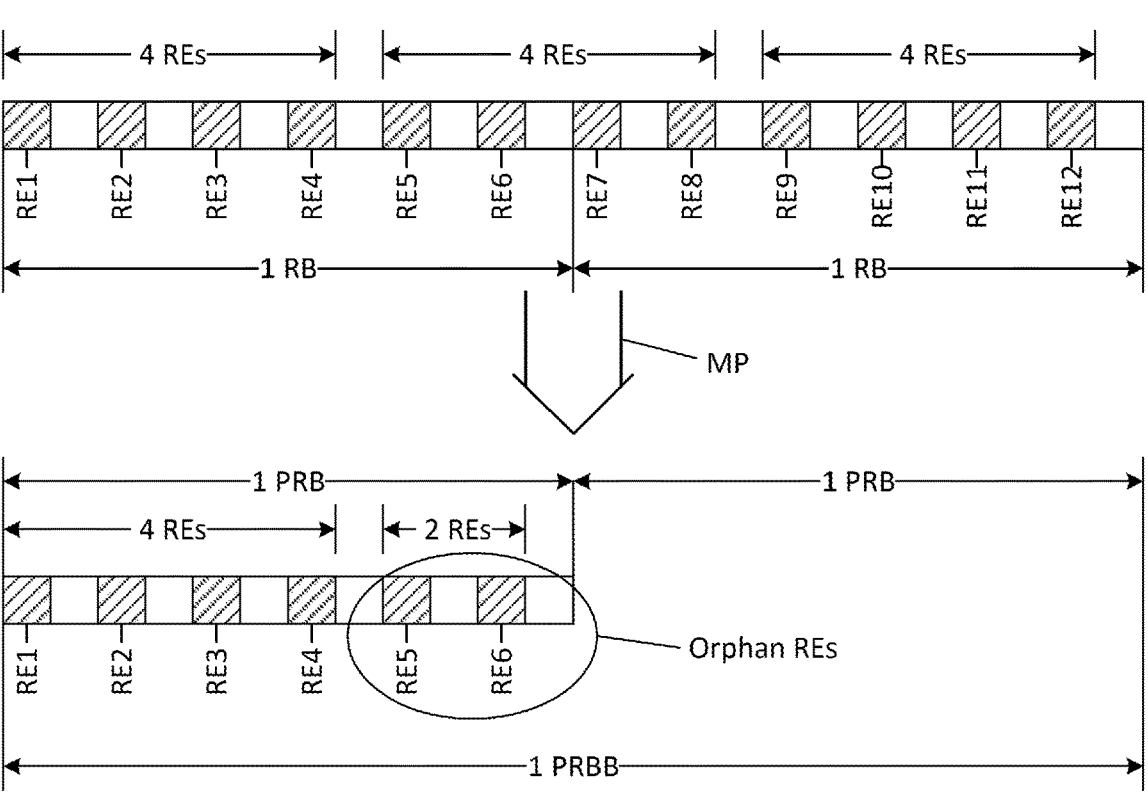
FIG. 4A is a diagram depicting an occurrence of orphan REs associated with Type 1.

FIG. 4A is a diagram depicting an occurrence of orphan REs associated with Type 1.

Referring to FIG. 4A, after a mapping MP, RE5 and RE6 may become orphan REs, due to being separated from RE7 and RE8, because a despreading group (e.g., a code group) including RE5 through RE8 is broken when the four REs are separated. As used herein, a "despreading group" is a group of REs that are supposed to be (e.g., intended to be) despread together for proper decoding and channel estimation. That is, a network node may provide for proper decoding and channel estimation by despreading (or keeping) the REs of a despreading group together. For example, OCC is a cover code. Length-4 OCC may be applied to the four REs of a despreading group, such that they may be properly decoded when despread (or despreaded) together before performing any further actions to the despreading group. Despreading effectively undoes the application of OCC. Accordingly, despreading may be interpreted (e.g., loosely interpreted) as being related to a type of "decoding" because the application of OCC is undone by way of despreading. Without having four REs to despread together, channel-estimation performance may be degraded.

Figure 4B:
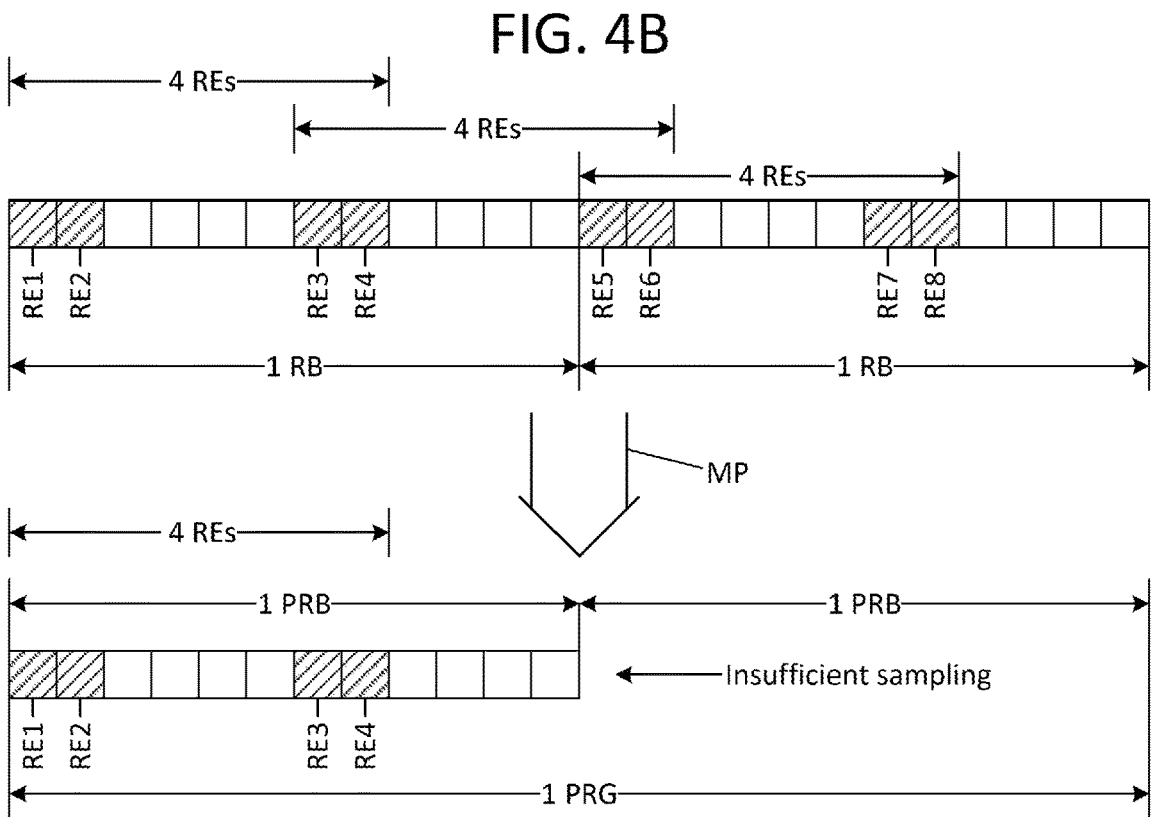
FIG. 4B is a diagram depicting an occurrence of insufficient sampling associated with Type 2.

FIG. 4B is a diagram depicting an occurrence of insufficient sampling associated with Type 2.

Referring to FIG. 4B, in some situations in Type 2, insufficient sampling may occur when an insufficient number of PRBs (e.g., only one PRB) is provided in a given PRG. For example, the UE may not have enough observation opportunities and, thus, may have insufficient samples to employ a frequency-domain interpolation operation to recover (e.g., to fully recover) the channel. Furthermore, more observation opportunities may provide a chance of better denoising performance.

FDRA type 1 supports only contiguous allocations of VRBs, and VRB-to-PRB mapping may be performed in either an interleaved manner or a non-interleaved manner. Accordingly, with FDRA type 1, the UE is allocated with a set of contiguously non-interleaved or contiguously interleaved PRBs. Interleaved VRB-to-PRB mapping may be done through RBBs, wherein each RBB is a set of 2 or 4 contiguous RBs. A network node may indicate resource allocations to the UE via a frequency-domain resource-assignment field within DCI formats 1_0, 1_1, and 1_2, wherein, by using a resource indication value (RIV), the UE may first derive a starting VRB and a number of allocated VRBs and then perform VRB-to-PRB mapping. The RIV may correspond to the starting VRB and the number of allocated VRBs in terms of individual RBs for DCI format 1_0 and 1_1. The RIV may correspond to the starting VRB and the number of allocated VRBs in terms of RBGs with a granularity of 2, 4, 8, or 16 RBs for DCI format 1_2.

Except for a last VRB bundle, VRB-to-PRB mapping of a j-th VRB bundle and its corresponding PRB bundle, denoted as the function $f(j)$, may be performed according to Equation 1 below:

$$f(j) = rC + c, \ j = cR + r, \qquad \text{(Equation 1)}$$

wherein R=2, $$C = \left\lfloor \frac{N_{bundle}}{R} \right\rfloor,$$

r=0, 1, . . . , R−1 and c=0, 1, . . . , C−1. The last VRB bundle is mapped to the last PRB bundle. $N_{bundle}$ refers to a number of available RBBs for interleaving. The variables R, r, C, and c provide a relationship (e.g., an unambiguous relationship) between VRB and PRB. Several examples of VRB-to-PRB mapping based on Equation 1 will be discussed in further detail below with respect to FIGS. 5A-5E.

Figure 5A:
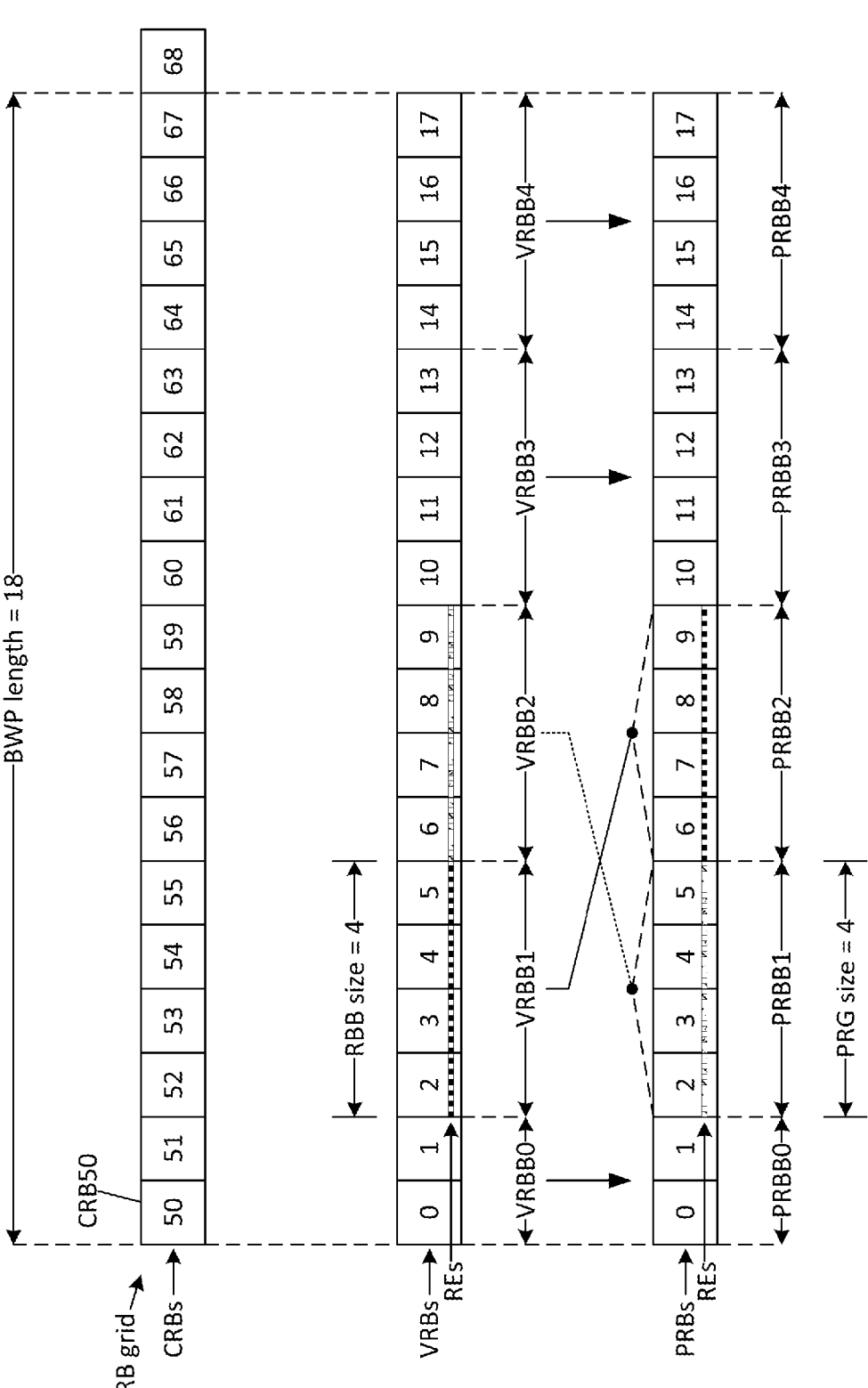
FIG. 5A is a diagram depicting an interleaved mapping of VRBs to PRBs with Type 1, using standardized restrictions and resulting in no orphan REs, wherein a bandwidth part (BWP) starts at a 50th CRB, a BWP length is 18 RBs, a resource block bundle (RBB) size is 4 RBs, and a precoding resource block group (PRG) size is 4 PRBs.

FIG. 5A is a diagram depicting an interleaved mapping of VRBs to PRBs with Type 1, using standardized restrictions and resulting in no orphan REs, wherein a BWP starts at a 50th CRB, a BWP length is 18 RBs, an RBB size is 4 RBs, and a PRG size is 4 PRBs.

Referring to FIG. 5A, one example of Type 1 is when a BWP start is a fiftieth RB (e.g., CRB50) with respect to the CRB0, a BWP length is 18 RBs, and an RBB size is 4 RBs. In this example, $N_{bundle}$=5. Accordingly, $$C = \left\lfloor \frac{N_{bundle}}{R} \right\rfloor = 2.$$

The VRB-to-PRB mapping results in VRBB0 mapping to PRBB0, VRBB1 mapping to PRBB2, VRBB2 mapping to PRBB1, VRBB3 mapping to PRBB3, and VRBB4 mapping to PRBB4.

In the NR Spec, the UE may assume a precoding granularity over consecutive resource blocks in the frequency domain through a PRG definition. PRG may be configured with reference to CRB0 and may be configured to 2 PRBs, 4 PRBs, or wideband. A smaller PRG size may correspond to a more limited channel estimation efficiency in terms of channel flatness in the frequency domain. If the PRG is configured as "wideband," the UE may not be scheduled with non-contiguous PRBs and the UE may assume that the same precoding is applied to all allocated resources.

A UE may report, to a network node, whether the UE is capable of scheduling a PDSCH without scheduling restrictions for Type 1. If the UE is not capable of scheduling a PDSCH without the scheduling restrictions, the UE may rely on the network node to provide scheduling restrictions for Type 1.

Except for multiple transmission-and-reception point (M-TRP) PDSCH transmission with frequency division multiplexing (FDM) 2a or FDM 2b schemes, the network node may apply the following two standardized restrictions (hereinafter, the "Standardized Restrictions"):

(1) a number of consecutively scheduled PRBs for a PDSCH is even; and (2) a number of PRBs offset from CRB0 for the PDSCH is even.

In the case of multi-user, multi-input, multi-output (MU-MIMO), additional restrictions may be applied on the scheduling of different UEs. Also, for M-TRP PDSCH transmission with FDM 2a or FDM 2b schemes, additional scheduling restrictions may be applied. Based on the NR Spec, the scheduling restrictions allow the UE to be responsible for how to implement DMRS channel estimation, and other scheduling restrictions are not precluded.

Because the Standardized Restrictions do not define PRBs outside of a configured BWP, the meaning of "PRBs offset," as provided in the second scheduling constraint is vague. In some embodiments of the present disclosure, the second constraint may be clarified by indicating that the number of CRBs offset from CRB0 to the starting PRB of the scheduled PDSCH is even.

For FDRA type 0, when the position of an allocated BWP within a CRB grid starts and ends at a CRB index value that is an integer multiple of an RBG, orphan REs may be prevented from occurring because each RBG has an even number of PRBs and is defined with reference to CRB0 and because a PDSCH bitmap allocation is in units of RBG. The possibility of having orphan REs may be prevented for FDRA type 0 under the Standardized Restrictions where they disallow the position of a BWP within a CRB grid to start or end at a CRB index value that is not an integer multiple of the RBG.

For FDRA type 1 with non-interleaved VRB-to-PRB mapping, because there is one-to-one mapping between each VRB and PRB, the Standardized Restrictions above may be sufficient to prevent the occurrence of orphan REs. For example, when a position of allocated VRBs within the CRB grid starts and ends at a CRB index value that is an integer multiple of an RBB, the occurrence of orphan REs may be prevented because each RBB may have an even number of VRBs and may be defined with reference to CRB0. In other words, the occurrence of orphan REs may be prevented, wherein a position of allocated VRBs within the CRB grid is forced to start and end at a CRB index value that is an integer multiple of an RBB. For example, if an RBB size is 2, a position of allocated VRBs within the CRB grid may start at CRB0 and end at CRB20 to prevent the occurrence of orphan REs.

Figure 5B:
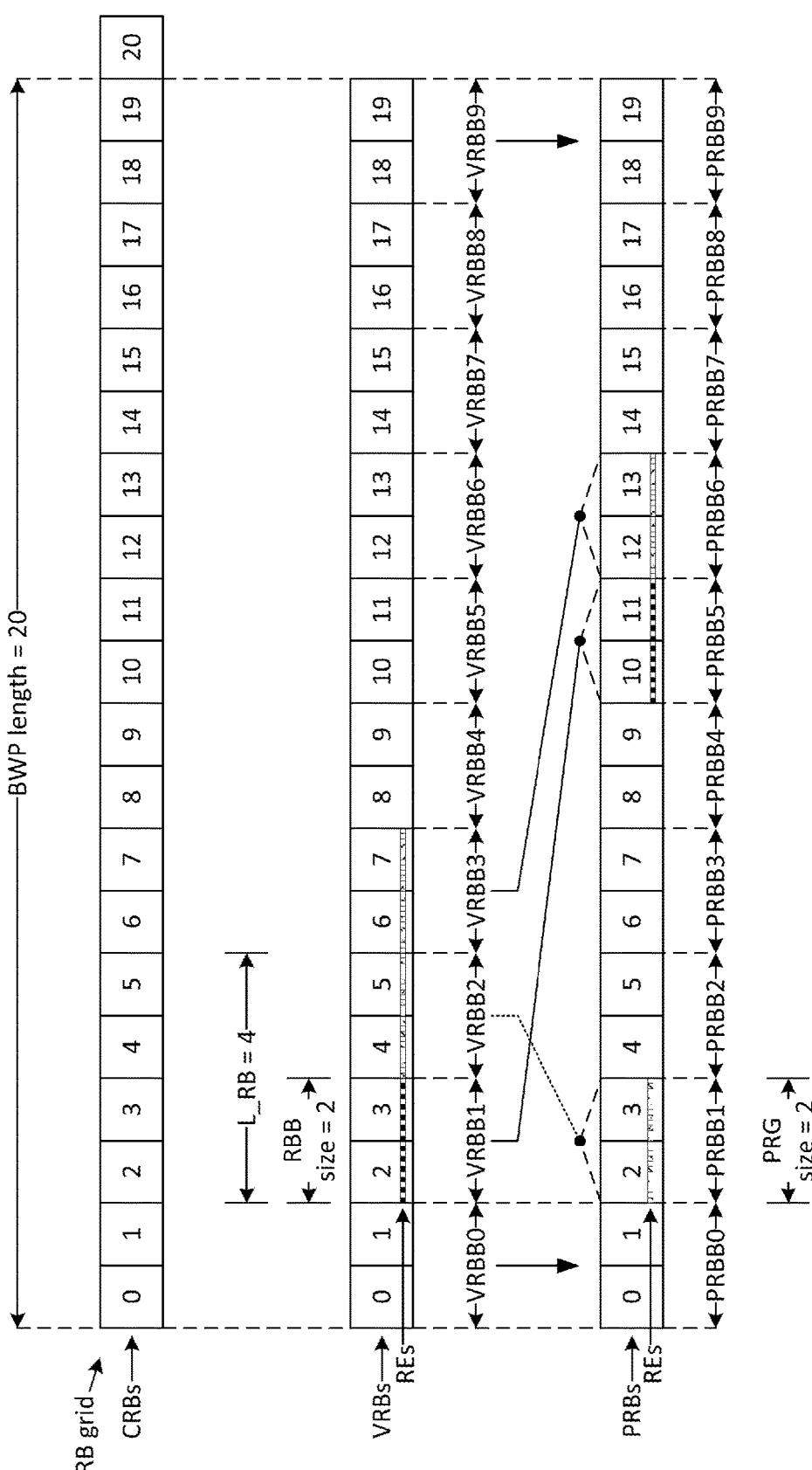
FIG. 5B is a diagram depicting an interleaved mapping of VRBs to PRBs with Type 1, using standardized restrictions and resulting in no orphan REs, wherein the BWP starts at an initial CRB (CRB0), the BWP length is 20 RBs, the RBB size is 2 RBs, the PRG size is 2 PRBs, a start VRB is 2, and a number of allocated VRBs (L_RB) is 4 RBs.

FIG. 5B is a diagram depicting an interleaved mapping of VRBs to PRBs with Type 1, using standardized restrictions and resulting in no orphan REs, wherein the BWP starts at an initial CRB, the BWP length is 20 RBs, the RBB size is 2 RBs, the PRG size is 2 PRBs, a start VRB is 2, and a number of allocated VRBs (L_RB) is 4 RBs.

Referring to FIG. 5B, for FDRA type 1 with interleaved VRB-to-PRB mapping, when a position of allocated VRBs within the CRB grid starts and ends at a CRB index value that is an integer multiple of an RBB, the occurrence of orphan REs may be prevented because each RBB has an even number of VRBs and is defined with reference to CRB0. For example, if a BWP start is CRB0, the BWP length is 20 RBs, interleaving bundle size RBB is 2 RBs, the PRG size is 2 PRBs, an RB start is at index 2, and a number of allocated VRBs (L_RB) is 4 RBs, as indicated in a DCI, then there may be an allocation scenario as depicted in FIG. 5B, wherein $N_{bundle}=10$ and $$C = \left\lfloor \frac{N_{bundle}}{R} \right\rfloor = 5,$$

such that the VRB-to-PRB mapping is as follows. VRBB0 maps to PRBB0; VRBB1 maps to PRBB5; VRBB2 maps to PRBB1; VRBB3 maps to PRBB6; VRBB4 maps to PRBB2; VRBB5 maps to PRBB7; VRBB6 maps to PRBB3; VRBB7 maps to PRBB8; VRBB8 maps to PRBB4; and VRBB9 maps to PRBB9.

In this example, because the number of CRBs offset from the first allocated VRB corresponding to CRB0 is even, the occurrence of orphan REs, potentially caused by the smaller size (e.g., 2 RBs) of the first VRB bundle, may be prevented. Furthermore, because the last VRBB is mapped to the last PRBB, due to the fact that the allocated VRBs for PDSCH end at an even number of CRBs (e.g., twenty CRBs) offset from CRB0, the occurrence of orphan REs, potentially caused by a smaller size of the last VRB, may also be prevented.

When a position of allocated VRBs within the CRB grid starts or ends at a CRB index value that is not an integer multiple of an RBB, the smaller bundle size in the first or last VRBs after interleaved VRB-to-PRB mapping may be located in the middle of the corresponding BWP, leading to possible orphan REs, wherein the Standardized Restrictions above may not prevent the occurrence of orphan REs, as discussed below with respect to FIG. 5C. As used herein, preventing an occurrence of orphan REs, refers to preventing one or more occurrences of REs that would not have been prevented without a given restriction being applied.

Figure 5C:
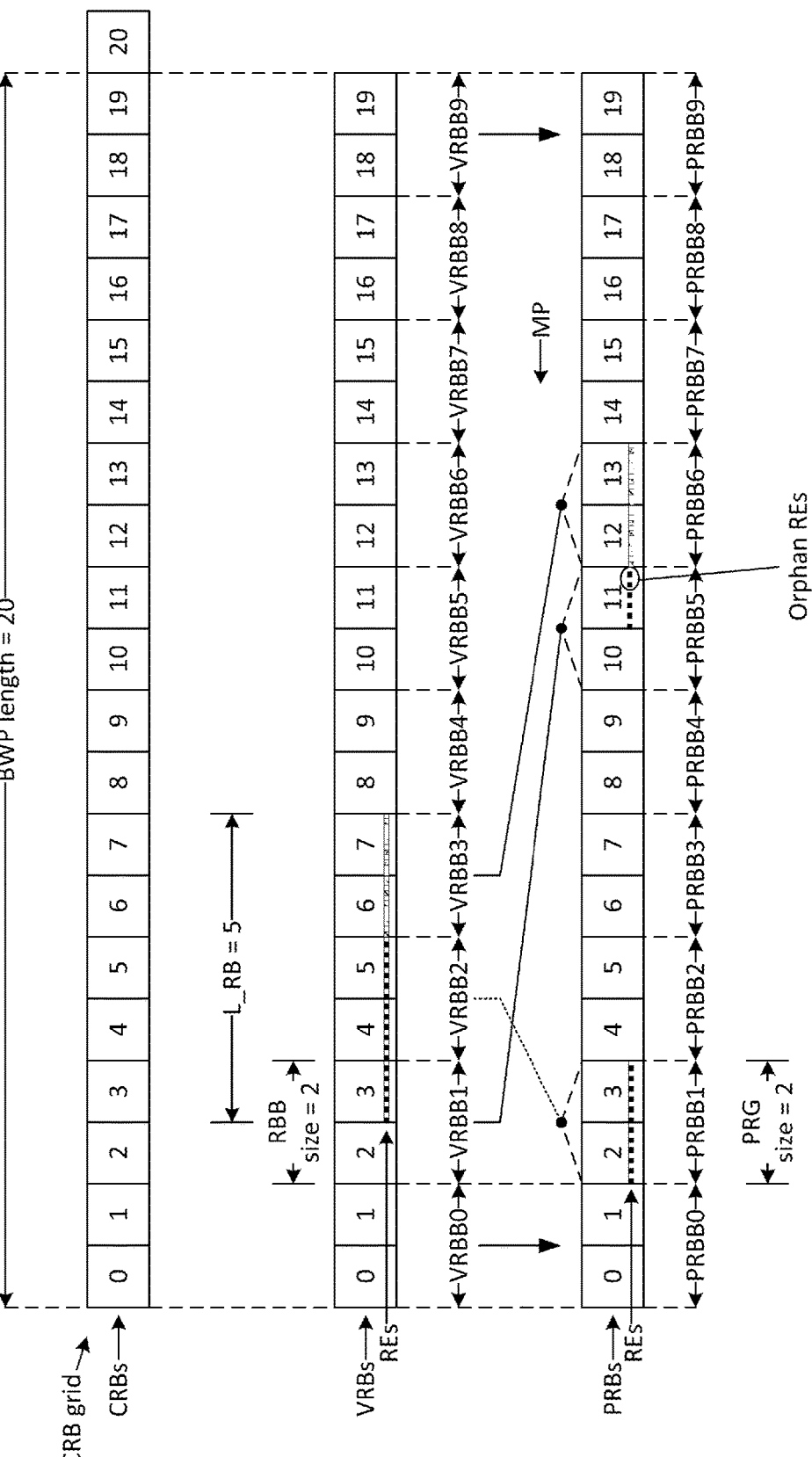
FIG. 5C is a diagram depicting an interleaved mapping of VRBs to PRBs with Type 1, using standardized restrictions and resulting in orphan REs, wherein the BWP starts at the initial CRB, the BWP length is 20 RBs, the RBB size is 2 RBs, the PRG size is 2 PRBs, the start VRB is 3, and the number of allocated VRBs (L_RB) is 5 RBs.

FIG. 5C is a diagram depicting an interleaved mapping of VRBs to PRBs with Type 1, using standardized restrictions and resulting in orphan REs, wherein the BWP starts at the initial CRB (CRB0), the BWP length is 20 RBs, the RBB size is 2 RBs, the PRG size is 2 PRBs, the start VRB is 3, and the number of allocated VRBs (L_RB) is 5 RBs.

Referring to FIG. 5C, a first scenario of three different scenarios where orphan REs may occur is shown. First, DCI may indicate an RB start of 3 and a number of allocated VRBs (L_RB) of 5 RBs. This is an example where VRBB1 includes a number of allocated RBs (e.g., 1 RB) that is smaller than the RBB size (e.g., 2 RBs). As seen, after VRB-to-PRB mapping MP, PRB11 may suffer from (e.g., may have) orphan REs because two allocated REs from the 4 allocated REs from VRB3 are separated from the REs of VRB4. To address this issue, in some embodiments of the present disclosure, the first scheduling restriction of the Standardized Restrictions may be extended to all bundles of allocated PRBs. For example, this restriction may be modified to make the number of consecutively scheduled PRBs in each bundle even. In some embodiments, a scheduling restriction may be added to disallow odd numbers of consecutively allocated VRBs. That is, a restriction may be provided that a number of consecutively scheduled VRBs in a PDSCH is even.

Figure 5D:
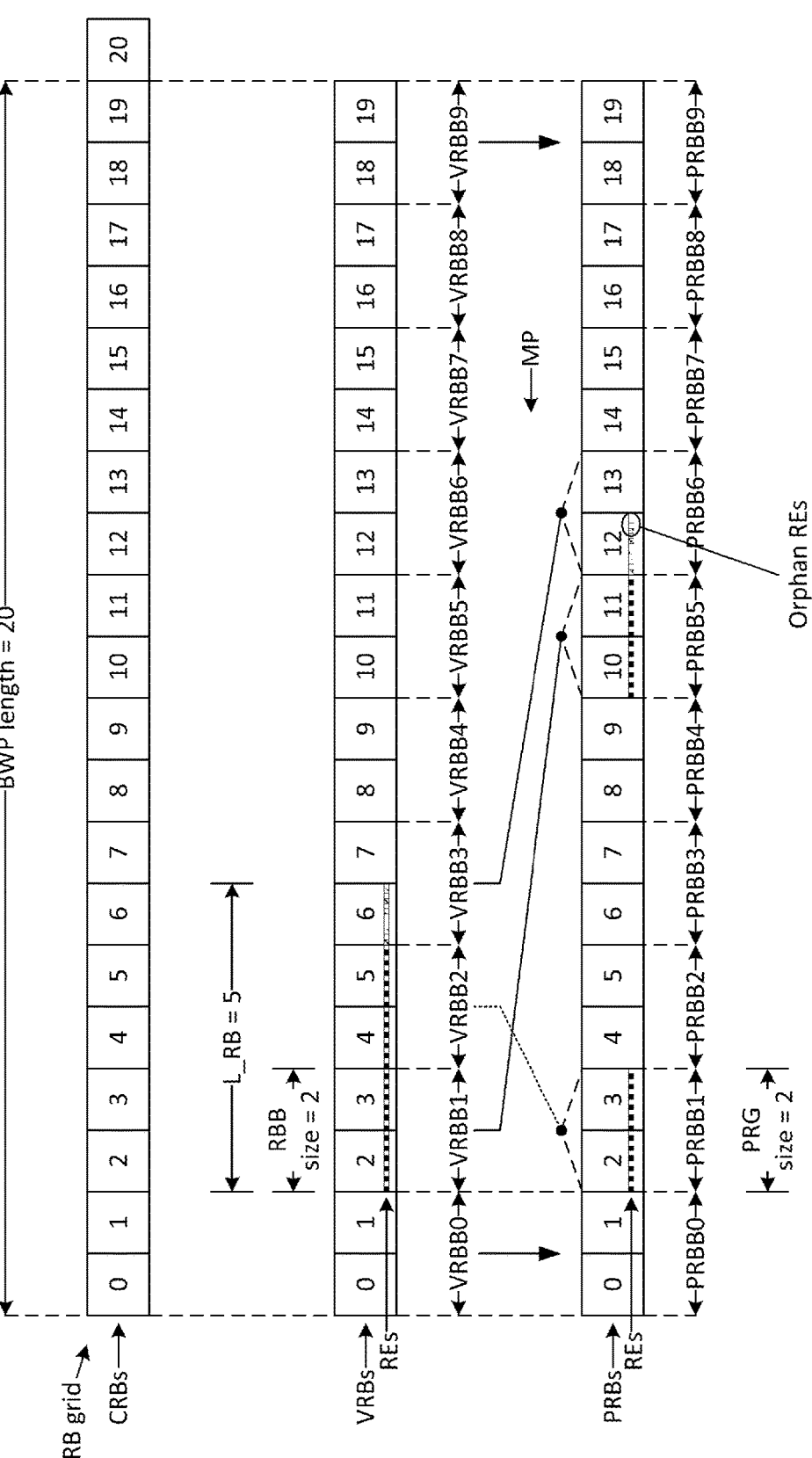
FIG. 5D is a diagram depicting an interleaved mapping of VRBs to PRBs with Type 1, using standardized restrictions and resulting in orphan REs, wherein the BWP starts at the initial CRB, the BWP length is 20 RBs, the RBB size is 2 RBs, the PRG size is 2 PRBs, the start VRB is 2, and the number of allocated VRBs (L_RB) is 5 RBs.

FIG. 5D is a diagram depicting an interleaved mapping of VRBs to PRBs with Type 1, using standardized restrictions and resulting in orphan REs, wherein the BWP starts at the initial CRB, the BWP length is 20 RBs, the RBB size is 2 RBs, the PRG size is 2 PRBs, the start VRB is 2, and the number of allocated VRBs (L_RB) is 5 RBs.

Referring to FIG. 5D, in another example scenario, DCI may indicate a VRB start of index 2 (VRB2) and a number of allocated VRBs (L_RB) of 5 RBs. In such a case, VRBB3 may have a number of allocated RBs (e.g., 1 RB at VRB6) that is smaller than the RBB size of 2 RBs. After VRB-to-PRB mapping MP, PRB12 may suffer from orphan REs. In some embodiments, to address this issue, the first scheduling restriction of the Standardized Restrictions may be extended to all bundles of allocated PRBs. For example, the restriction may be modified to make the number of consecutively scheduled PRBs in each bundle even. In some embodiments, a scheduling restriction may be added to disallow odd numbers of consecutively allocated VRBs. That is, the number of consecutively scheduled VRBs in a PDSCH may be restricted to being even.

Figure 5E:
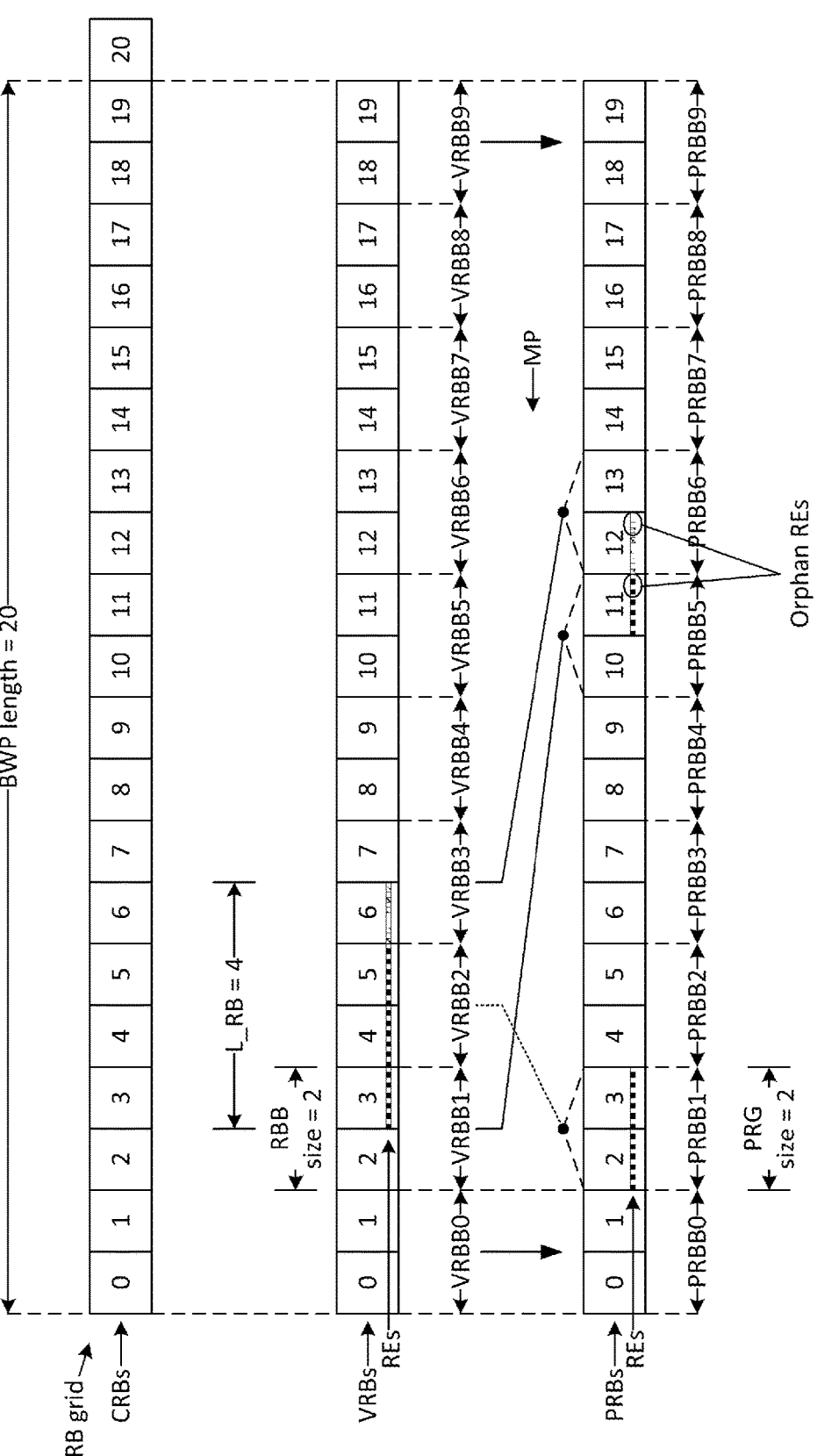
FIG. 5E is a diagram depicting an interleaved mapping of VRBs to PRBs with Type 1, using standardized restrictions and resulting in orphan REs, wherein the BWP starts at the initial CRB, the BWP length is 20 RBs, the RBB size is 2 RBs, the PRG size is 2 PRBs, the start VRB is 3, and the number of allocated VRBs (L_RB) is 4 RBs.

FIG. 5E is a diagram depicting an interleaved mapping of VRBs to PRBs with Type 1, using standardized restrictions and resulting in orphan REs, wherein the BWP starts at the initial CRB, the BWP length is 20 RBs, the RBB size is 2 RBs, the PRG size is 2 PRBs, the start VRB is 3, and the number of allocated VRBs (L_RB) is 4 RBs.

Referring to FIG. 5E, as another example scenario, a DCI may indicate a VRB start of index 3 (VRB3) and a number of allocated VRBs (L_RB) of 4 RBs. Both the VRBB1 and VRBB3 may have a number of allocated RBs (e.g., 1 RB) that is smaller than the RBB size of 2 RBs. In such a case, after VRB-to-PRB mapping, a number of consecutively scheduled PRBs for PDSCH may be even, and the number of CRBs offset from CRB0 to a starting PRB of a scheduled PDSCH may be even. However, PRB11 and PRB12 may both suffer from orphan REs.

In some embodiments, to address this issue, the second scheduling restriction of the Standardized Restrictions may be extended to each bundle of continuous PRBs. For example, the second restriction of the Standardized Restrictions may be modified to make a number of CRBs offset from CRB0 to the starting PRB of each consecutively scheduled PRB for a PDSCH even. In some embodiments, a scheduling restriction may be added to disallow odd values for an RB start. That is, the number of CRBs offset from CRB0 to the starting VRB of a scheduled PDSCH may restricted to be even.

In summary, in Type 1, the occurrence of orphan REs may be prevented by modifying both scheduling restrictions of the Standardized Restrictions to be applied on a per-bundle (of PRBs) basis. For example, (1) a number of consecutively scheduled PRBs per bundle for a PDSCH may be restricted to being even, and (2) a number of CRBs or PRBs offset from CRB0 to a starting PRB of each bundle of consecutively scheduled PRBs for a PDSCH may be restricted to being even.

In some embodiments, the occurrence of orphan REs may be prevented by modifying both scheduling restrictions of the Standardized Restrictions, discussed above, per bundle of VRBs, instead of PRBs. For example, (1) a number of consecutively scheduled VRBs for a PDSCH may be restricted to be even, and (2) a number of CRBs (or PRBs) offset from CRB0 to the starting VRB of a scheduled PDSCH may be restricted to be even.

In some embodiments, the occurrence of orphan REs may be prevented by not supporting (e.g., by not allowing) FD-OCC length 4 eType 1 DMRS with "interleaved" VRB-to-PRB mapping configurations. Non-interleaved mapping provides one-to-one mapping between each VRB and PRB, such that the two scheduling restrictions of the Standardized Restrictions, discussed above, may be sufficient to prevent the occurrence of orphan REs.

In some embodiments, if a UE can receive PDSCH without the Standardized Restrictions for Type 1, all the following scheduling restriction may be applied for a PDSCH transmission with fdmSchemeA or fdmSchemeB. A number of consecutively scheduled PRBs for a PDSCH for each TRP/transmission-configuration indicator state (TRP/TCI state) may be restricted to be even. A number of PRBs offset from CRB0 for a scheduled PDSCH for each TRP/TCI state may be restricted to be even. As used herein, "fdmSchemeA" refers to an FDM scheme, wherein the UE receives a single PDSCH transmission occasion of a transport block (TB) with each TCI state that is associated with a non-overlapping frequency domain resource allocation. As used herein, "fdmSchemeB" refers to an FDM scheme, wherein the UE receives two PDSCH transmission occasions of a same TB with each TCI state that is associated with a non-overlapping frequency domain resource allocation.

The use case of FDM-based MTRP PDSCH transmission with FD-OCC length-4 DMRS ports is not clear because, in the NR Spec, FDM-based MTRP PDSCH transmission only supports single-user MIMO (SU-MIMO) scenarios, and the transmission rank per PDSCH transmission occasion is limited to two, wherein FD-OCC length-2 DMRS ports may be sufficient FDM-based MTRP PDSCH transmission. Thus, it may be desirable to rule out the support of such FDM-based MTRP PDSCH transmission Type 1 in MU-MIMO due to a legitimate issue with orphan REs at a UE and the fact that the NR Spec does not provide scheduling restrictions for FDM schemes. Otherwise, in some embodiments, the occurrence of orphan REs and corresponding UE-implementation concerns may be avoided, by extending all aforementioned scheduling restrictions, individually, per TRP frequency-domain resource allocation. In other words, the Standardized Restrictions and/or any modified restrictions or enhanced restrictions discussed above may be extended to FDM-based MTRP PDSCH transmission with FD-OCC length-4 DMRS ports per TRP frequency-domain resource allocation to avoid the occurrence of orphan REs and corresponding UE-implementation concerns.

FIG. 6 is a flowchart depicting a method for a scheduling of PDSCH for Type 1, according to some embodiments of the present disclosure to reduce (e.g., to prevent) the occurrence of orphan REs.

Referring to FIG. 6, a method 600 for scheduling and/or processing a PDSCH (e.g., for Type 1) may include one or more of the following restrictions. A network node may restrict an allocation of RBs, such that only a one-to-one mapping of VRBs to PRBs is allowed (operation 601). Based on an interleaved mapping of VRBs to PRBs being allowed, the network node may restrict the first allocation of resource blocks, such that: (1) a number of common resource blocks (CRBs) to a starting PRB for the first PDSCH is even; or (2) a position of a BWP within a CRB grid for the first PDSCH starts and ends at a CRB index value that is an integer multiple of a resource block group (RBG); or (3) a position of allocated VRBs within the CRB grid starts and ends at a CRB index value that is an integer multiple of a resource block bundle (RBB) for the first PDSCH; or (4) a number of consecutively scheduled PRBs in a bundle for the first PDSCH is even (e.g., when a UE is not indicating UE capability of [noSchedulingRestriction-r18], the UE may assume the number of consecutively scheduled PRBs are even); or (5) a number of consecutively scheduled VRBs for the first PDSCH is even; or (6) a number of CRBs offset from an initial CRB of the CRB grid, for a set (e.g., each set) of consecutively scheduled PRBs for the first PDSCH is even (e.g., when a UE is not indicating UE capability of [noSchedulingRestriction-r18], the UE may assume the offset of each set of consecutively scheduled PRBs from CRB0 is an even number); or (7) a number of CRBs offset from the initial CRB of the CRB grid to a starting VRB for the first PDSCH is even; or (8) a number of consecutively scheduled VRBs for the first PDSCH is even; or (9) a number of CRBs or PRBs offset from the initial CRB of the CRB grid to the starting VRB for the first PDSCH is even (operation 602). A UE may process the PDSCH based on determining that one or more of the above-mentioned restrictions apply to the PDSCH.

Figures 7A, 7B, 7C:
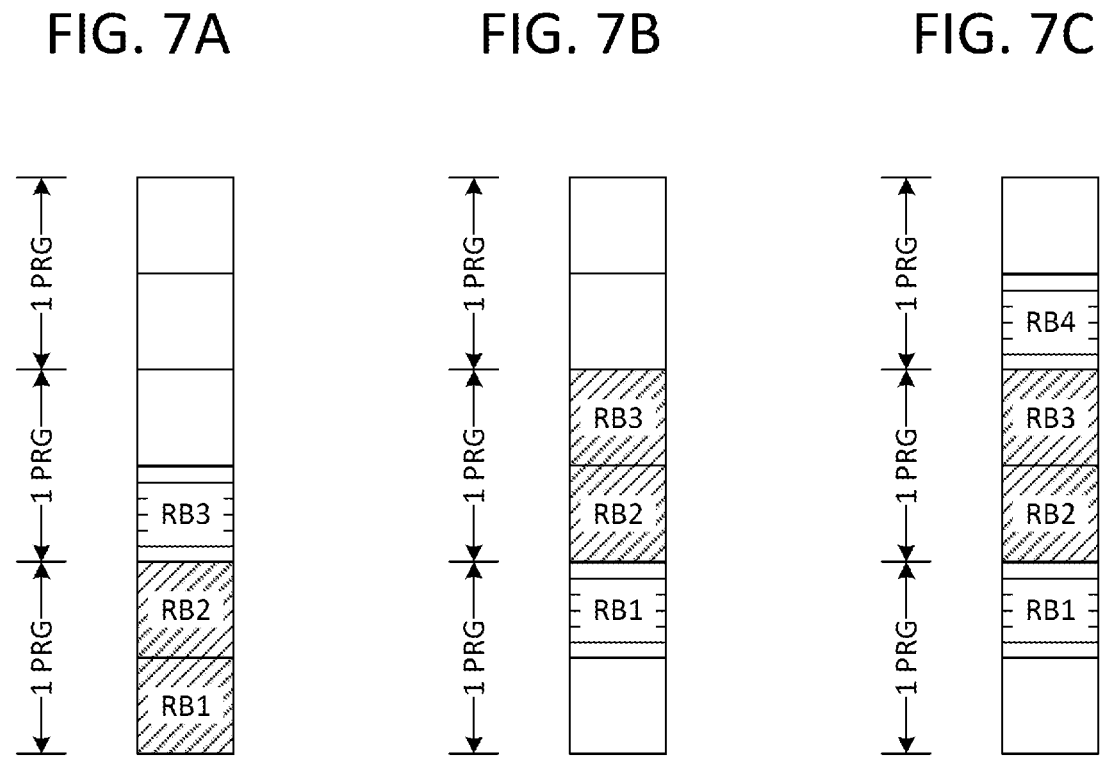

FIG. 7A is a diagram depicting a scheduling of PDSCH for Type 2, resulting in insufficient sampling, wherein the PRG size is 2 RBs, a number of consecutively scheduled VRBs (or PRBs) is odd, and a number of VRBs (or PRBs) offset from an initial CRB is even.

FIG. 7B is a diagram depicting a scheduling of PDSCH for Type 2, resulting in insufficient sampling, wherein the PRG size is 2 RBs, the number of consecutively scheduled VRBs (or PRBs) is odd, and the number of VRBs (or PRBs) offset from an initial CRB is odd.

FIG. 7C is a diagram depicting a scheduling of PDSCH for Type 2, resulting in insufficient sampling, wherein the PRG size is 2 RBs, the number of consecutively scheduled VRBs (or PRBs) is even, and the number of VRBs (or PRBs) offset from the initial CRB is odd.

Type 2 may be supported as follows, based on the NR Spec. Length 4 FD-OCC may be applied to four REs of DMRS within a PRB within a CDM group. With the support of Type 2, when the total number of DL DMRS RBs in a CDM group is not even and/or when the number of PRBs offset from CRB0 of a PDSCH is not even, it may be desirable to address decoding and channel estimation concerns at the UE. Decoding and channel estimation concerns may arise because Type 2 is applied within one PRB, which provides only one observation opportunity per RB at a UE for channel estimation. This may introduce challenges for UE performance. For example, and as discussed above, the UE may not have enough observation opportunities and samples to employ a frequency-domain interpolation operation to fully recover the channel. Additionally, a denoising performance of the UE may be decreased with fewer observation opportunities.

Depending on a configured PRG size, such resource allocation limitations may be problematic for the UE. For example, when there are at least two RBs in one PRG, the UE may still have two samples for the frequency-domain interpolation and/or denoising. However, with some configured PRG size, the UE may end up with only one RB within a PRG, which may be problematic for decoding and channel estimation at the UE. To address this problem, in some embodiments of the present disclosure, the network node may ensure that a minimum number of allocated RBs within each allocated PRG is at least M1, wherein M1 is greater than one (e.g., M1 may be equal to 2, 3, etc.) and refers to a minimum number of allocated RBs within each allocated PRG. For example, if M1 equals three, then the network node may ensure that there are at least three allocated RBs within each allocated PRG.

When PRG size is configured as "wideband", if there is only one DL DMRS RB in a CDM group, the UE may have only one RB within a PRG for channel estimation. As a solution, some embodiments may support Type 2 with a PRG size configured as wideband when the total number of DL DMRS RBs in a CDM group is at least M2, wherein M2 is greater than one (e.g., M2 may be equal to 2, 3, etc.) and refers to a minimum number of total allocated DL DMRS RBs. As used herein, "DL DMRS RB" refers to an allocated RB containing DMRS.

When a PRG is configured as 2 PRBs, if the total number of DL DMRS RBs in a CDM group is not even, a UE may end up with only one RB within a PRG. Additionally, when a PRG is configured as 2 PRBs, if the total number of DL DMRS RBs in a CDM group is two, a UE may still end up with only one RB within a PRG, depending on the allocation offset of DMRS RBs with respect to the PRG boundaries.

Referring to FIGS. 7A-7C, and as discussed above, problematic scenario examples are depicted for when the PRG size is configured as 2 PRBs. In FIGS. 7A-9C, problematic RBs are depicted with horizontal lines in the RB. For example, in FIG. 7A, RB3 is problematic because it is the only RB in its PRG. In FIG. 7B, RB1 is problematic because it is the only RB in its PRG. In FIG. 7C, RB4 is problematic because it is the only RB in its PRG.

In some embodiments of the present disclosure, Type 2 may be supported with PRG size configured as 2 PRBs, based on the following restrictions: (1) a number of consecutively scheduled VRBs and/or PRBs for a PDSCH may be restricted to be even; and (2) a number of VRBs and/or PRBs offset from CRB0 of a PDSCH may be restricted to be even.

FIG. 8A is a diagram depicting a scheduling of PDSCH for Type 2, resulting in insufficient sampling, wherein the PRG size is 4 RBs, the number of consecutively scheduled VRBs (or PRBs) is 4k+1, and the number of VRBs (or PRBs) offset from an initial CRB is 4l, wherein k and l are integers.

FIG. 8B is a diagram depicting a scheduling of PDSCH for Type 2, resulting in insufficient sampling, wherein the PRG size is 4 RBs, the number of consecutively scheduled VRBs (or PRBs) is 4k+1, and the number of VRBs (or PRBs) offset from an initial CRB is 4l+3, wherein k and l are integers.

FIG. 8C is diagram depicting a scheduling of PDSCH for Type 2, resulting in insufficient sampling, wherein the PRG size is 4 RBs, the number of consecutively scheduled VRBs (or PRBs) is 4k+2, and the number of VRBs (or PRBs) offset from an initial CRB is 4l+3, wherein k and l are integers.

FIG. 8D is a diagram depicting a scheduling of PDSCH for Type 2, resulting in insufficient sampling, wherein the PRG size is 4 RBs, the number of consecutively scheduled VRBs (or PRBs) is 4k+3, and the number of VRBs (or PRBs) offset from an initial CRB is 4l+2, wherein k and l are integers.

FIG. 8E is diagram depicting a scheduling of PDSCH for Type 2, resulting in insufficient sampling, wherein the PRG size is 4 RBs, the number of consecutively scheduled VRBs (or PRBs) is 4k+3, and the number of VRBs (or PRBs) offset from an initial CRB is 4l+3, wherein k and l are integers.

FIG. 9A is a diagram depicting a scheduling of PDSCH for Type 2, resulting in insufficient sampling, wherein the PRG size is 4 RBs, the number of consecutively scheduled VRBs (or PRBs) is 4k, and the number of VRBs (or PRBs) offset from an initial CRB is 4l+3, wherein k and l are integers.

FIG. 9B is diagram depicting a scheduling of PDSCH for Type 2, resulting in insufficient sampling, wherein the PRG size is 4 RBs, the number of consecutively scheduled VRBs (or PRBs) is 4k, and the number of VRBs (or PRBs) offset from an initial CRB is 4l+3, wherein k and l are integers.

FIG. 9C is diagram depicting a scheduling of PDSCH for Type 2, resulting in insufficient sampling, wherein the PRG size is 4 RBs, the number of consecutively scheduled VRBs (or PRBs) is 4k, and the number of VRBs (or PRBs) offset from an initial CRB is 4l+1, wherein k and l are integers.

Referring to FIGS. 8A-8E, when a PRG is configured as "4 PRBs," there may be problematic scenarios resulting in only one RB within a PRG, depending on the allocation starting point of the DMRS RBs with respect to a PRG boundary. To avoid such problematic scenarios, one or more of the following restrictions may be applied for Type 2 with a PRG size configured as 4 PRBs. For example, for cases where M1 or M2 is equal to 2, one or more of the following restrictions may be applied (wherein k and l are integers): (i) a total number of DL DMRS RBs in a CDM group may be more than one; (ii) a total number consecutively scheduled VRBs and/or PRBs for a PDSCH in a CDM group may be 4k+1, and a number of VRBs and/or PRBs offset from point A (CRB0) of a scheduled PDSCH may not be 4l or 4l+3 to avoid the problematic scenarios of FIGS. 8A and 8B (where only one RB, which is indicated by horizontal lines, is provided in a PRG); (iii) a total number of consecutively scheduled VRBs and/or PRBs for a PDSCH in a CDM group may be 4k+2, and a number of VRBs and/or PRBs offset from CRB0 of a PDSCH may not be 4l+3 to avoid the problematic scenario of FIG. 8C; (iv) a total number of consecutively scheduled VRBs and/or PRB for a PDSCH in a CDM group may be 4k+3 and a number of VRBs and/or PRBs offset from point CRB0 of a PDSCH may not be 4l+2 or 4l+3 to avoid the problematic scenarios of FIGS. 8D and 8E; and, referring to FIGS. 9A-9C, (v) a total number of consecutively scheduled VRBs and/or PRBs for a PDSCH in a CDM group may be 4k and a number of VRBs and/or PRBs offset from CRB0 of a PDSCH may not be 4l+3 or 4l+1 to avoid the problematic scenarios of FIGS. 9A-9C.

FIG. 10 is a flowchart depicting a method for a scheduling of PDSCH for Type 2, according to some embodiments of the present disclosure to reduce (e.g., to prevent) the occurrence of insufficient sampling. As used herein, preventing an occurrence of insufficient sampling, refers to preventing one or more occurrences of insufficient sampling that would not have been prevented without a given restriction being applied.

Referring to FIG. 10, a method 1000 for scheduling a PDSCH (e.g., for Type 2) may include one or more of the following restrictions. A network node may restrict an allocation of RBs, such that a minimum number of RBs allocated within an allocated PRG is at least equal to M1, wherein M1 is a minimum number of allocated RBs within each allocated PRG, M1 being greater than one; or based on determining that a PRG size is configured for wideband, a minimum total number of RBs in a CDM group is at least equal to M2, wherein M2 is a minimum number of total allocated DL DMRS RBs, M2 being greater than one; or based on determining that the PRG size is configured as two PRBs, a number of consecutively scheduled VRBs or PRBs for the first PDSCH is even; or based on determining that the PRG size is configured as two PRBs, a number of VRBs or PRBs offset from an initial CRB of a CRB grid for the first PDSCH is even; or a number of consecutively scheduled VRBs for the first PDSCH is even; or a number of CRBs or PRBs offset from the initial CRB of the CRB grid to a starting VRB for the first PDSCH is even; or a number of consecutively scheduled PRBs per bundle for the first PDSCH is even, and a number of CRBs or PRBs offset to a starting PRB of a bundle of consecutively scheduled PRBs for the first PDSCH from the initial CRB of the CRB grid is even; or a number of consecutively scheduled VRBs per bundle for the first PDSCH is even, and a number of CRBs or VRBs offset to the starting VRB of a bundle of consecutively scheduled VRBs for the first PDSCH from the initial CRB of the CRB grid is even (operation 1001). A UE may process the PDSCH based on determining that one or more of the above-mentioned restrictions apply to the PDSCH.

Figure 11:
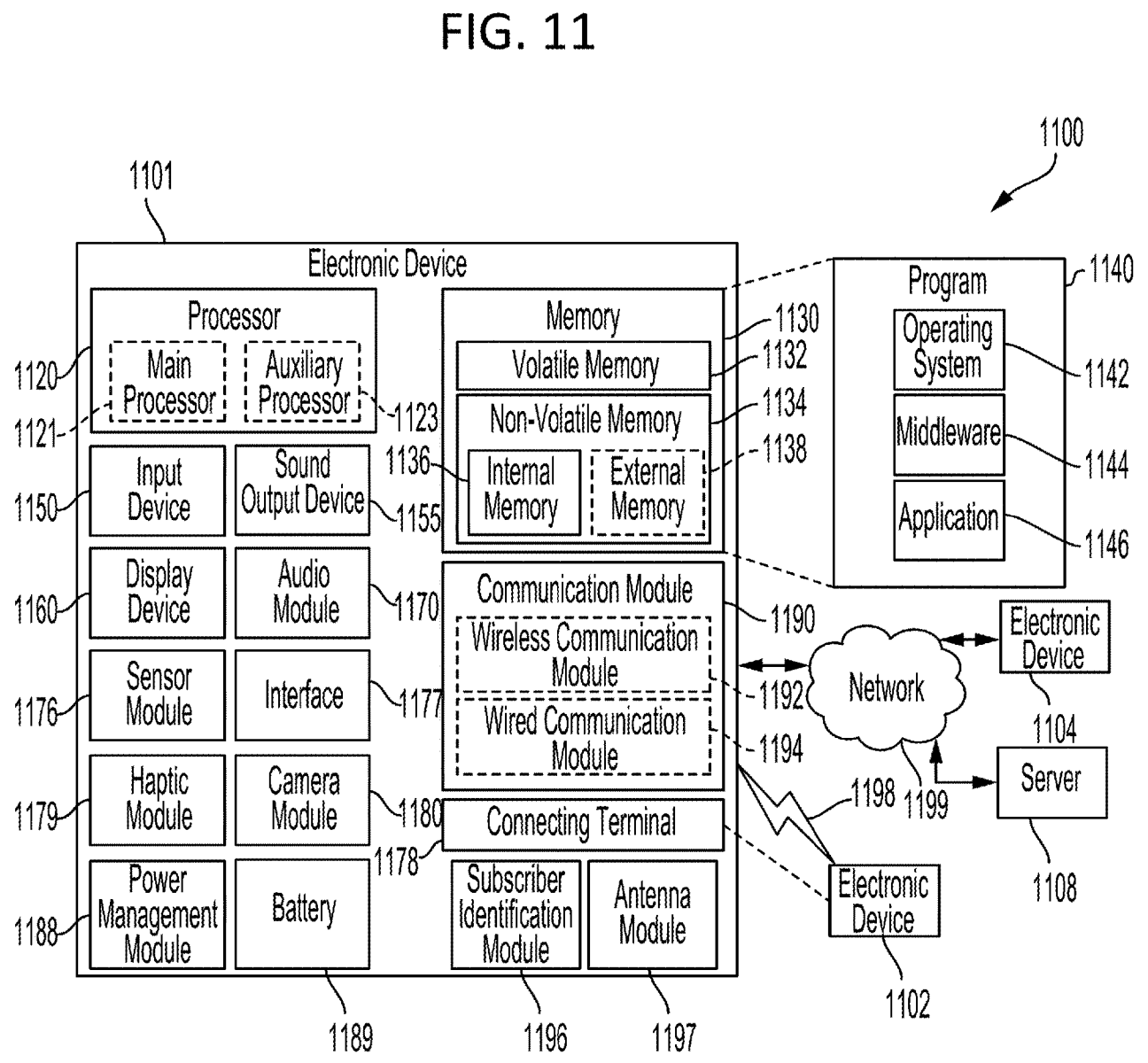

FIG. 11 is a block diagram of an electronic device in a network environment, according to some embodiments of the present disclosure.

Referring to FIG. 11, an electronic device 1101 in a network environment 1100 may communicate with an electronic device 1102 via a first network 1198 (e.g., a short-range wireless communication network), or with an electronic device 1104 or a server 1108 via a second network 1199 (e.g., a long-range wireless communication network). The electronic device 1101 may communicate with the electronic device 1104 via the server 1108. The electronic device 1101 may include a processor 1120, a memory 1130, an input device 1140, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) card 1196, and/or an antenna module 1197. In one embodiment, at least one of the components (e.g., the display device 1160 or the camera module 1180) may be omitted from the electronic device 1101, or one or more other components may be added to the electronic device 1101. Some of the components may be implemented as a single integrated circuit (IC). For example, the sensor module 1176 (e.g., a fingerprint sensor, an iris sensor, or an illuminance sensor) may be embedded in the display device 1160 (e.g., a display).

The processor 1120 may execute software (e.g., a program 1140) to control at least one other component (e.g., a hardware or a software component) of the electronic device 1101 coupled to the processor 1120, and may perform various data processing or computations.

As at least part of the data processing or computations, the processor 1120 may load a command or data received from another component (e.g., the sensor module 1176 or the communication module 1190) in volatile memory 1132, may process the command or the data stored in the volatile memory 1132, and may store resulting data in non-volatile memory 1134. The processor 1120 may include a main processor 1121 (e.g., a CPU or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to execute a particular function. The auxiliary processor 1123 may be implemented as being separate from, or a part of, the main processor 1121.

The auxiliary processor 1123 may control at least some of the functions or states related to at least one component (e.g., the display device 1160, the sensor module 1176, or the communication module 1190), as opposed to the main processor 1121 while the main processor 1121 is in an inactive (e.g., sleep) state, or together with the main processor 1121 while the main processor 1121 is in an active state (e.g., executing an application). The auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by another component (e.g., the processor 1120) of the electronic device 1101, from the outside (e.g., a user) of the electronic device 1101. The input device 1150 may include, for example, a microphone, a mouse, or a keyboard.

The sound output device 1155 may output sound signals to the outside of the electronic device 1101. The sound output device 1155 may include, for example, a speaker or a receiver. The speaker may be used for general purposes, such as playing multimedia or recording, and the receiver may be used for receiving an incoming call. The receiver may be implemented as separate from, or as a part of, the speaker.

The display device 1160 may visually provide information to the outside (e.g., to a user) of the electronic device 1101. The display device 1160 may include, for example, a display, a hologram device, or a projector, and may include control circuitry to control a corresponding one of the display, hologram device, and projector. The display device 1160 may include touch circuitry adapted to detect a touch, or may include sensor circuitry (e.g., a pressure sensor) adapted to measure the intensity of force incurred by the touch.

The audio module 1170 may convert a sound into an electrical signal and vice versa. The audio module 1170 may obtain the sound via the input device 1150 or may output the sound via the sound output device 1155 or a headphone of an external electronic device 1102 directly (e.g., wired) or wirelessly coupled to the electronic device 1101.

The sensor module 1176 may detect an operational state (e.g., power or temperature) of the electronic device 1101, or an environmental state (e.g., a state of a user) external to the electronic device 1101. The sensor module 1176 may then generate an electrical signal or data value corresponding to the detected state. The sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 1177 may support one or more specified protocols to be used for the electronic device 1101 to be coupled to the external electronic device 1102 directly (e.g., wired) or wirelessly. The interface 1177 may include, for example, a high-definition multimedia interface (HDMI), a universal serial bus (USB) interface, a secure digital (SD) card interface, or an audio interface.

A connecting terminal 1178 may include a connector via which the electronic device 1101 may be physically connected to the external electronic device 1102. The connecting terminal 1178 may include, for example, an HDMI connector, a USB connector, an SD card connector, or an audio connector (e.g., a headphone connector).

The haptic module 1179 may convert an electrical signal into a mechanical stimulus (e.g., a vibration or a movement) or an electrical stimulus, which may be recognized by a user via tactile sensation or kinesthetic sensation. The haptic module 1179 may include, for example, a motor, a piezo-electric element, or an electrical stimulator.

The camera module 1180 may capture a still image or moving images. The camera module 1180 may include one or more lenses, image sensors, image signal processors, or flashes. The power management module 1188 may manage power that is supplied to the electronic device 1101. The power management module 1188 may be implemented as at least part of, for example, a power management integrated circuit (PMIC).

The battery 1189 may supply power to at least one component of the electronic device 1101. The battery 1189 may include, for example, a primary cell that is not rechargeable, a secondary cell that is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108), and may support performing communication via the established communication channel. The communication module 1190 may include one or more communication processors that are operable independently from the processor 1120 (e.g., the AP), and may support a direct (e.g., wired) communication or a wireless communication. The communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as BLUETOOTH™, wireless-fidelity (Wi-Fi) direct, or a standard of the Infrared Data Association (IrDA)), or via the second network 1199 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. The antenna module 1197 may include one or more antennas. The communication module 1190 (e.g., the wireless communication module 1192) may select at least one of the one or more antennas appropriate for a communication scheme used in the communication network, such as the first network 1198 or the second network 1199. The signal or the power may then be transmitted or received between the communication module 1190 and the external electronic device via the selected at least one antenna.

Commands or data may be transmitted or received between the electronic device 1101 and the external electronic device 1104 via the server 1108 coupled to the second network 1199. Each of the electronic devices 1102 and 1104 may be a device of a same type as, or a different type, from the electronic device 1101. All or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims, with functional equivalents thereof to be included therein.

What is claimed is:

1. A method for processing, by a user equipment (UE), a first physical downlink shared channel (PDSCH), the method comprising:

processing, by the UE, the first PDSCH based on determining that one or more first restrictions apply to the first PDSCH, the one or more first restrictions comprising:

restricting a first allocation of resource blocks, such that:

a number of consecutively scheduled physical resource blocks (PRBs) in a bundle for the first PDSCH is even; and a number of common resource blocks (CRBs) offset from an initial CRB of a CRB grid for a set of consecutively scheduled PRBs for the first PDSCH is even; and based on an interleaved mapping of virtual resource blocks (VRBs) to PRBs being allowed, restricting a second allocation of resource blocks, such that only a one-to-one mapping of VRBs to PRBs is allowed.

2. The method of claim 1, further comprising processing a second PDSCH based on determining that one or more second restrictions apply to the second PDSCH, the one or more second restrictions comprising:

restricting a third allocation of resource blocks, such that:

a number of CRBs to a starting PRB for the second PDSCH is even; or a position of a BWP within a CRB grid for the second PDSCH starts and ends at a CRB index value that is an integer multiple of a resource block group (RBG); or a position of allocated VRBs within the CRB grid starts and ends at a CRB index value that is an integer multiple of a resource block bundle (RBB) for the second PDSCH; or a number of consecutively scheduled VRBs for the second PDSCH is even; or a number of CRBs offset from the initial CRB of the CRB grid to a starting VRB for the second PDSCH is even; or a number of consecutively scheduled VRBs for the second PDSCH is even; or a number of CRBs or PRBs offset from the initial CRB of the CRB grid to the starting VRB for the second PDSCH is even.

3. The method of claim 2 further comprising:

based on restricting the third allocation of resource blocks, such that only the one-to-one mapping of VRBs to PRBs is allowed, supporting FD-OCC length 4 eType 2 DMRS.

4. The method of claim 1, wherein the one or more first restrictions are applied based on determining that the UE associated with processing the first PDSCH is configured to process the first PDSCH only with restrictions.

5. The method of claim 1, wherein, based on determining that a second PDSCH corresponds to a frequency division multiplexing Scheme A (fdmSchemeA) transmission or a frequency-division multiplexing Scheme B (fdmSchemeB) transmission, processing the second PDSCH based on determining that one or more second restrictions apply to the second PDSCH, the one or more second restrictions comprising restricting a third allocation of resource blocks, such that:

a number of consecutively scheduled PRBs for the second PDSCH for a transmission-and-reception point/transmission configuration indicator (TRP/TCI) state is even; or a number of PRBs offset from the initial CRB of the CRB grid for the second PDSCH to a TRP/TCI state is even; or a multi-user, multiple input, multiple output (MU-MIMO) frequency division multiplexing (FDM)-based multi-TRP (MTRP) PDSCH is prevented for the second PDSCH; or a number of consecutively scheduled PRBs for the second PDSCH for a TRP frequency-domain resource allocation is even; or a number of PRBs offset from an initial CRB of the CRB grid for the second PDSCH to the TRP frequency-domain resource allocation is even.

6. A system for processing a first physical downlink shared channel (PDSCH), the system comprising a UE comprising a processing circuit and memory comprising instructions that, when executed by the processing circuit, cause the UE to process the first PDSCH based on determining that one or more first restrictions apply to the first PDSCH, the one or more first restrictions comprising:

restricting a first allocation of resource blocks for the first PDSCH, such that:

a number of consecutively scheduled physical resource blocks (PRBs) in a bundle for the first PDSCH is even; and a number of common resource blocks (CRBs) offset from an initial CRB of a CRB grid for a set of consecutively scheduled PRBs for the first PDSCH is even; and based on an interleaved mapping of virtual resource blocks (VRBs) to PRBs being allowed, restricting a second allocation of resource blocks, such that only a one-to-one mapping of VRBs to PRBs is allowed.

7. The system of claim 6, wherein the instructions, when executed by the processing circuit, further cause the UE to process a second PDSCH based on determining that one or more second restrictions apply to the second PDSCH, the one or more second restrictions comprising:

restricting a third allocation of resource blocks for the second PDSCH, such that:

a number of consecutively scheduled VRBs for the second PDSCH is even; and a number of CRBs or PRBs offset from an initial CRB of a CRB grid to a starting VRB for the second PDSCH is even.

8. The system of claim 6, wherein the instructions, when executed by the processing circuit, further cause the UE to process a second PDSCH based on determining that one or more second restrictions apply to the second PDSCH, the one or more second restrictions comprising:

based on the second PDSCH having a PRG size of 2, restricting a third allocation of resource blocks for the second PDSCH, such that a number of consecutively scheduled VRBs or PRBs for the first PDSCH is even.

9. The system of claim 6, wherein the instructions, when executed by the processing circuit, further cause the UE to process a second PDSCH based on determining that one or more second restrictions apply to the second PDSCH, the one or more second restrictions comprising restricting a third allocation of resource blocks for the second PDSCH, such that a number of common resource blocks (CRBs) to a starting PRB for the second PDSCH is even.

10. The system of claim 6, wherein the instructions, when executed by the processing circuit, further cause the UE to process a second PDSCH based on determining that one or more second restrictions apply to the second PDSCH, the one or more second restrictions comprising restricting a third allocation of resource blocks for the second PDSCH, such that a position of a bandwidth part (BWP) within a CRB grid for the second PDSCH starts and ends at a CRB index value that is an integer multiple of a resource block group (RBG).

11. The system of claim 6, wherein the instructions, when executed by the processing circuit, further cause the UE to process a second PDSCH based on determining that one or more second restrictions apply to the second PDSCH, the one or more second restrictions comprising restricting a third allocation of resource blocks for the second PDSCH, such that a position of allocated VRBs within a CRB grid for the second PDSCH starts and ends at a CRB index value that is an integer multiple of a resource block bundle (RBB).

* * * * *